(12) United States Patent
Duong et al.

(10) Patent No.: US 11,443,454 B2
(45) Date of Patent: Sep. 13, 2022

(54) METHOD FOR ESTIMATING THE POSE OF A CAMERA IN THE FRAME OF REFERENCE OF A THREE-DIMENSIONAL SCENE, DEVICE, AUGMENTED REALITY SYSTEM AND COMPUTER PROGRAM THEREFOR

(71) Applicant: FONDATION B-COM, Cesson Sevigne (FR)

(72) Inventors: Nam-Duong Duong, Rennes (FR); Amine Kacete, Rennes (FR); Catherine Soladie, La Bouexiere (FR)

(73) Assignee: FONDATION B-COM, Cesson Sevigne (FR)

( * ) Notice: Subject to any disclaimer, the term of this patent is extended or adjusted under 35 U.S.C. 154(b) by 94 days.

(21) Appl. No.: 16/762,853

(22) PCT Filed: Oct. 24, 2018

(86) PCT No.: PCT/EP2018/079179
§ 371 (c)(1),
(2) Date: May 8, 2020

(87) PCT Pub. No.: WO2019/091787
PCT Pub. Date: May 16, 2019

(65) Prior Publication Data
US 2021/0174539 A1   Jun. 10, 2021

(30) Foreign Application Priority Data

Nov. 9, 2017 (FR) ..................... 1760541
May 25, 2018 (FR) ..................... 1854435

(51) Int. Cl.
*G06T 7/73* (2017.01)
*G06N 3/08* (2006.01)
*G06N 5/00* (2006.01)

(52) U.S. Cl.
CPC .............. *G06T 7/74* (2017.01); *G06N 3/082* (2013.01); *G06N 5/003* (2013.01);
(Continued)

(58) Field of Classification Search
CPC ...................................................... G06T 7/70
See application file for complete search history.

(56) References Cited

U.S. PATENT DOCUMENTS

2019/0108651 A1\* 4/2019 Gu ..................... G06N 3/0454

OTHER PUBLICATIONS

T. Sattler, B. Leibe and L. Kobbelt, "Fast image-based localization using direct 2D-to-3D matching," 2011 International Conference on Computer Vision, 2011, pp. 667-674, doi: 10.1109/ICCV.2011.6126302. (Year: 2011).\*

(Continued)

*Primary Examiner* — Ross Varndell
(74) *Attorney, Agent, or Firm* — David D. Brush; Westman, Champlin & Koehler, P.A.

(57) ABSTRACT

A method for estimating a camera pose in a frame of reference of a three-dimensional scene, including: obtaining an image of colour intensities of the scene; extracting points of interest, which are invariant by geometric transformation of the image; forming patches in the image, each including an extracted point of interest; predicting 3D locations of the points of interest by applying an automatic prediction system, trained by a training set including patches from images acquired from plural points of view, an image being associated with a 2D position of its point of interest in a frame of reference of the image and with a 3D position of its point of interest in the frame of reference of the scene; estimating the pose of a camera, by mapping the 2D positions of the points of interest and reprojections in the current image frame of reference of the predicted 3D locations.

11 Claims, 10 Drawing Sheets

(52) U.S. Cl.
CPC ............... *G06T 2207/10024* (2013.01); *G06T 2207/20081* (2013.01); *G06T 2207/20084* (2013.01); *G06T 2207/30244* (2013.01)

(56) References Cited

OTHER PUBLICATIONS

Meng et al., "Backtracking regression forests for accurate camera relocalization", 2017 IEEE/RSJ International Conference on Intelligent Robots and Systems (IROS), IEEE, Sep. 24, 2017 (Sep. 24, 2017), pp. 6886-6893, XP033266762. (Year: 2017).*

International Search Report dated Jan. 23, 2019 for corresponding International Application No. PCT/EP2018/079179, filed Oct. 24, 2018.

Written Opinion of the International Searching Authority dated Jan. 23, 2019 for corresponding International Application No. PCT/EP2018/079179, filed Oct. 24, 2018.

Torsten Sattler et al: "Fast image-based localization using direct 2D-to-3D matching", 2013 IEEE International Conference on Computer Vision, Nov. 1, 2011 (Nov. 1, 2011), pp. 667-674, XP055298542.

Meng Lili et al: "Backtracking regression forests for accurate camera relocalization", 2017 IEEE/RSJ International Conference on Intelligent Robots and Systems (IROS), IEEE, Sep. 24, 2017 (Sep. 24, 2017), pp. 6886-6893, XP033266762.

Eric Brachmann et al: "DSAC—Differentiable RANSAC for Camera Localization", arXiv, Aug. 7, 2017 (Aug. 7, 2017), pp. 1-11, XP055456666.

David G. Lowe: "Distinctive Image Features from Scale-Invariant Keypoints", International Journal of Computer Vision, vol. 60, No. 2, Jan. 5, 2004 (Jan. 5, 2004), pp. 91-110, XP055203065.

Irschara A et al: "From structure-from-motion point clouds to fast location recognition", 2009 IEEE Conference on Computer Vision and Pattern Recognition : CVPR 2009 ; Miami [Beach], Florida, USA, Jun. 20-25, 2009, IEEE, Piscataway, NJ, Jun. 20, 2009 (Jun. 20, 2009), pp. 2599-2606, XP031607114.

Wasenmüller et al. entitled "Corbs: Comprehensive RGB-D Benchmark for SLAM using Kinect v2", published by the Applications of Computer Vision conference in 2016, pp. 1-7.

He et al., "Deep residual learning for image recognition" published in the Proceedings of the IEEE conference on computer vision and pattern recognition, in 2016.

Kendall et al., "Geometric loss functions for camera pose regression with deep learning" and published on ArXiv.2017.

Szegedy et al., "Going deeper with convolutions" published in the Proceedings of the IEEE conference on computer vision and pattern recognition, in 2015.

Krizhevsky et al., "Imagenet classification with deep convolutional neural networks," published in the journal "Advances in neural information processing systems," in 2012.

Newcombe et al., "KinectFusion: Real-time Dense Surface Mapping and Tracking", by the IEEE International Symposium on Mixed and Augmented Reality (ISMAR), 2011.

Kendall et al., "PoseNet: A convolutional Network for Rel-Time 6-DOF Camera Relocalization", published in the Proceedings of the IEEE International Conference on Computer Vision, pp. 2938-2946, in 2015.

Shotton et al., "Scene Coordinate Regression Forests for Camera Relocation in RGB-D images", published by the IEEE Conference on Computer Vision and Pattern Recognition in 2013.

Bay et al., "Speeded-up Robust Features (SURF)", Computer Vision and Image Understanding, Issue 110, pp. 346-359, 2008.

Simonyan et al., "Very Deep Convolutional Networks for Large-Scale Image Recognition," published in ICLR, in 2014.

* cited by examiner

METHOD FOR ESTIMATING THE POSE OF A CAMERA IN THE FRAME OF REFERENCE OF A THREE-DIMENSIONAL SCENE, DEVICE, AUGMENTED REALITY SYSTEM AND COMPUTER PROGRAM THEREFOR

1. CROSS-REFERENCE TO RELATED APPLICATIONS

This Application is a Section 371 National Stage Application of International Application No. PCT/EP2018/079179, filed Oct. 24, 2018, the content of which is incorporated herein by reference in its entirety, and published as WO 2019/091787 on May 16, 2019, not in English.

2. FIELD OF THE INVENTION

The field of invention is that of estimating the pose of a camera in the frame of reference of a three-dimensional (3D) scene.

The invention may in particular, but not exclusively, find application in the field of augmented reality, for the insertion of one or more virtual or real objects in the image of the real scene seen by the camera.

3. PRESENTATION OF THE PRIOR ART

We know from the document by Shotton et al. Scene Coordinate Regression Forests for Camera Relocation in RGB-D images", published by the IEEE Conference on Computer Vision and Pattern Recognition in 2013, a solution for calculating the pose of an RGB-D camera (for "Red Green Blue—Depth") is known, This system, after a learning phase, is capable of predicting a cloud of corresponding points in a reference frame of the 3D scene from a colour intensity image and a depth image acquired by the camera. The camera pose is then estimated on the basis of the predicted point cloud.

One advantage of this solution is that it predicts the camera pose completely automatically without any geometric assumptions.

A first disadvantage of this solution is that it requires the manipulation of point clouds, which makes it complex to implement, particularly because it requires significant computing and storage resources.

A second disadvantage of this method is that it comprises, both in the learning phase and in the test phase, a prior transformation of the image in order to take into account intrinsic parameters of the camera, such as focal lengths or projection centres. This step requires prior calibration of the camera.

A third disadvantage of this solution is that it requires a depth camera in the test phase, which excludes its use for an embedded virtual reality application in mobile-type terminal equipment, such as a smartphone or tablet.

A method for directly estimating camera pose from 2D RGB camera images and a convolutional neural network is also known from Kendall et al. paper entitled "PoseNet: A convolutional Network for Rel-Time 6-DOF Camera Relocalization", published in the Proceedings of the IEEE International Conference on Computer Vision, pages 2938-2946, in 2015. The neural network used is adapted from a known and trained neural network to classify images by modifying certain layers. This method will be called "PoseNet-1". The learning of the network is performed from a database of whole RGB images and their corresponding poses. It is based on the minimization of a loss function that takes into account the weighted sum of a translation error and a pose rotation error. The weighting includes a scaling factor that depends on the scene.

A major disadvantage of the PoseNet-1 solution is that the value of the scaling factor is difficult to determine. Its evaluation is done empirically, which requires several learnings from which an optimal value is determined. The configuration of the network is therefore complex.

In a second, more recent publication, entitled "Geometric loss functions for camera pose regression with deep learning" and published on ArXiv.2017, the same authors proposed a new version called "PoseNet-2" of their method which uses a purely geometric loss function that does not use a scale factor.

An advantage of both solutions is that they perform a real-time estimation of the camera pose.

A disadvantage of these PoseNet-2 methods is that they do not always estimate the camera pose with sufficient accuracy for augmented reality applications and do not provide any indication of the accuracy or confidence associated with pose estimation.

4. SUMMARY OF THE INVENTION

An exemplary aspect of the present invention relates to a method for estimating the pose of a camera in a frame of reference of a three-dimensional scene, said method comprising the following steps:

Obtaining an image of color intensities of the scene captured by the camera, known as the current image;

Extracting a plurality of points of interest from the current image, one said point being invariant by geometric transformation of the image;

Forming a plurality of patches in the image of colour intensities, a patch comprising a point of interest of the extracted plurality;

Predicting the 3D locations of the points of interest of the plurality of patches in a scene reference frame by applying an automatic prediction system, said system having been trained using a training set comprising patches from a plurality of scene images acquired by the camera from a plurality of viewpoints, a patch being associated with a 2D position of its point of interest in an image reference frame and a 3D location of its point of interest in the scene reference frame; and Estimating a camera pose for the current image, by mapping the 2D positions of the plurality of points of interest and reprojections in the current image frame of reference of the predicted 3D locations.

The invention is based on a completely new and inventive approach to estimating the pose of a camera, which relies on a direct prediction of the 3D localization of small image areas or patches centered on points of interest in the image from their 2D position in the input image, without the need for a depth map, and on a 3D/2D mapping of the localizations of the points of interest in the image, independent of previously acquired images.

Rather than using all the points in the image, the invention restricts prediction to small areas of the image, called patches, which concentrate the relevant information, thereby reducing the complexity of the system without compromising its efficiency.

Predicting the 3D location of patches (3 components) rather than directly the camera pose (6 components) also helps to simplify the structure of the automatic prediction system.

According to a first aspect of the invention, the prediction step predicts a 3D localization per patch by applying an automatic prediction system comprising a neural network comprising several convolution layers and several connection layers.

An advantage of this first embodiment is that it achieves a good compromise between complexity and performance.

According to a second aspect of the invention, the prediction step further comprises an extraction of a feature vector per patch and in that the application of the automatic prediction system predicts a plurality of 3D locations per extracted feature vector.

An advantage of this second method is that the extraction of a feature vector improves the accuracy of the predicted 3D localization and thus of the estimated pose.

A further aspect of the invention is that the automatic prediction system comprises a decision random forest comprising decision trees comprising separator nodes, a said node being capable of binary separating a group of feature vectors from an upstream node into subgroups, forwarding the subgroups to downstream separator nodes and leaf nodes, capable of storing the plurality of 3D locations of the patches associated with a subgroup received from an upstream separator node, the method comprises in a preliminary phase a prediction system training step comprising a binary separation test based on a distance calculation between the feature vector extracted from a patch of the training set and a reference feature vector and a comparison of the calculated distance with respect to a predetermined threshold.

Contrary to binary tests usually performed in a decisional forest, which evaluate a distance between two randomly chosen elements in the same channel of an input data, such as for example a difference between two intensities of pixels of the same image, the invention proposes to compare all the components of the feature vector associated with a patch to a reference feature vector. For example, the feature vector is chosen from among the feature vectors extracted from the patches of the learning set by iteration of the test and according to an error minimization criterion. This allows better discrimination of key points from each other.

The advantage of using a random decision forest is that it comprises several trained trees each predicting a location from an input vector, making the pose estimation process more robust to scenes with repetitive patterns.

A further aspect of the invention is that the extraction comprises feature vector prediction by application of a second automatic prediction system, said system having been trained using a training set comprising patches from a plurality of images of the scene acquired by the camera from a plurality of viewpoints, a patch being associated in said set with a 2D position of its point of interest in a frame of reference of the image and a 3D position of its point of interest in the frame of reference of the scene.

One advantage is to obtain even more relevant feature vectors and to improve the prediction performance and thus the accuracy of the estimated laying.

Advantageously, the second automatic prediction system comprising a neural network comprising several convolution layers and the method comprises in a preliminary phase a step of training the second system from the training set, after adding to said neural network a plurality of connection layers arranged following the convolution layers.

In this way, the neural network enriched with connection layers provides output of predicted 3D locations, which correspond to the ground truths provided in the training set.

Once learning is complete, the user simply removes the connection layers to obtain the feature vectors he has learned to extract from the input data.

According to one aspect of the invention, the preliminary learning phase includes a step of obtaining (A3) 3D localizations of the plurality of points of interest in the scene's reference frame, known as ground truth by geometric triangulation of the 2D positions of the point in the image and in a previous image.

Alternatively, the preliminary training phase comprises a step of acquiring a depth image associated with an intensity image, the training set further comprises the depth image associated with the intensity image, a step of obtaining (A3) 3D localizations of the plurality of points of interest in the referential of the scene, known as ground truth by perspective projection of their 2D position and depth by means of a predetermined model of the camera and the known pose, in the referential of the scene.

According to another aspect of the invention, the pose estimation comprises the implementation of at least one iteration of the following sub-steps:
   Determining a subset of the plurality of points of interest;
   Calculating at least one pose assumption from the predicted 3D locations for the sub-assembly and the corresponding 2D positions; and
   Evaluating a reprojection error of the 2D positions of the plurality of points of interest in the reference frame of the scene using the calculated pose hypothesis with respect to the predicted 3D locations;
   and a selection of the pose hypothesis that minimizes reprojection error.

One advantage of this method is that only the best 3D location predictions are taken into account in the pose estimate.

According to another aspect of the invention, a measure of confidence of the estimated pose is evaluated at least according to a number of points of interest, for which the reprojection error is below a predetermined threshold.

An advantage of this confidence measure is that it brings a probabilistic dimension to the estimated pose.

According to yet another aspect of the invention, the method comprises a preliminary learning phase comprising the following steps:
   Obtaining a training set comprising a plurality of colour intensity images of the scene acquired by the camera, from a plurality of viewpoints, one viewpoint being associated with a known pose of the camera;
   Extracting a plurality of points of interest from said color intensity image, one said point being associated with a 2D position in the intensity image;
   Obtaining 3D localizations of the plurality of points of interest in the scene's referential, the so-called ground truth;
   Driving the automatic pose prediction system from pairs of patches, a patch pair being associated with the 2D position of its point of interest in an image frame of reference and the 3D location of its point of interest in the scene frame of reference.

According to a first option, in the training phase, the 3D localization of a point of interest in the intensity image associated with a known pose is obtained by geometrically triangulating the 2D positions of the point in the image and in a previous image.

An advantage of this method is that it does not require a depth camera to label the input data.

According to a second option, in the learning phase, the camera is configured to simultaneously acquire a depth image associated with an intensity image and:
- the resulting training set comprises a plurality of pairs of images of colour intensity and depth of the scene, from a plurality of points of view, one point of view being associated with a known pose of the camera;
- the 3D locations of the points of interest are obtained by perspective projection of their 2D position and depth using a predetermined model of the camera and the known pose in the scene's frame of reference.

One advantage of this method of production is that it allows simple and effective labelling of the patches thanks to the use of a camera with a depth limited to the teaching phase.

Advantageously, the prediction is implemented by a neural network comprising 5 convolution stages.

An advantage of this particular neural network architecture is that it is shallow, while allowing efficient prediction of 3D locations of image points of interest in the scene's frame of reference directly from intensity patches.

According to yet another aspect of the invention, the plurality of 3D locations predicted by the random decision forest comprising a distribution of predicted 3D locations per tree, one said distribution being associated with a measure of covariance, the estimation step comprises a prior sub-step of filtering the plurality of distributions of predicted 3D locations by comparing the measure of covariance associated with a distribution to a predetermined threshold and removing the predicted distribution whose measure of covariance is greater than or equal to said threshold.

An advantage is, when the automatic prediction system includes a random decision forest that produces a Gaussian distribution of predicted 3D locations per tree, to keep only the means of the most compact distributions for the pose estimation.

The invention also relates to a device adapted to implement the method for estimating the pose according to any one of the particular embodiments defined above. This device may of course include the various characteristics relating to the method according to the invention. Thus, the characteristics and advantages of this device are the same as those of the method of estimating the pose, and are not further detailed.

Advantageously, such a device is included in a terminal equipment, for example a tablet or smartphone.

The invention also relates to an augmented reality system comprising a camera capable of acquiring an image of colour intensities of a real three-dimensional scene, an image composition module capable of composing an output image from an input image acquired of the scene by the camera and at least one real or virtual object, using an initial 3D location of said at least one object in the scene and an estimated camera pose, a display module capable of rendering the output image and a device for estimating the pose of the camera just described.

The invention also relates to a computer program comprising instructions for implementing the steps of a method for estimating the pose of a camera as described above, when this program is executed by a processor.

This program can use any programming language. It can be downloaded from a communication network and/or saved on a computer-readable medium.

Finally, the invention relates to a recording medium, readable by a processor, integrated or not in the device for estimating the pose of a camera according to the invention, possibly removable, storing a computer program implementing a method for estimating the pose of a camera, as described above.

5. LIST OF FIGURES

Other advantages and characteristics of the invention will become clearer on reading the following description of a particular embodiment of the invention, given as a simple illustrative and non-limitative example, and the appended drawings, among which:

FIG. 1 schematically describes the steps of a method for estimating the pose according to the invention in a learning phase;

Figure 4:
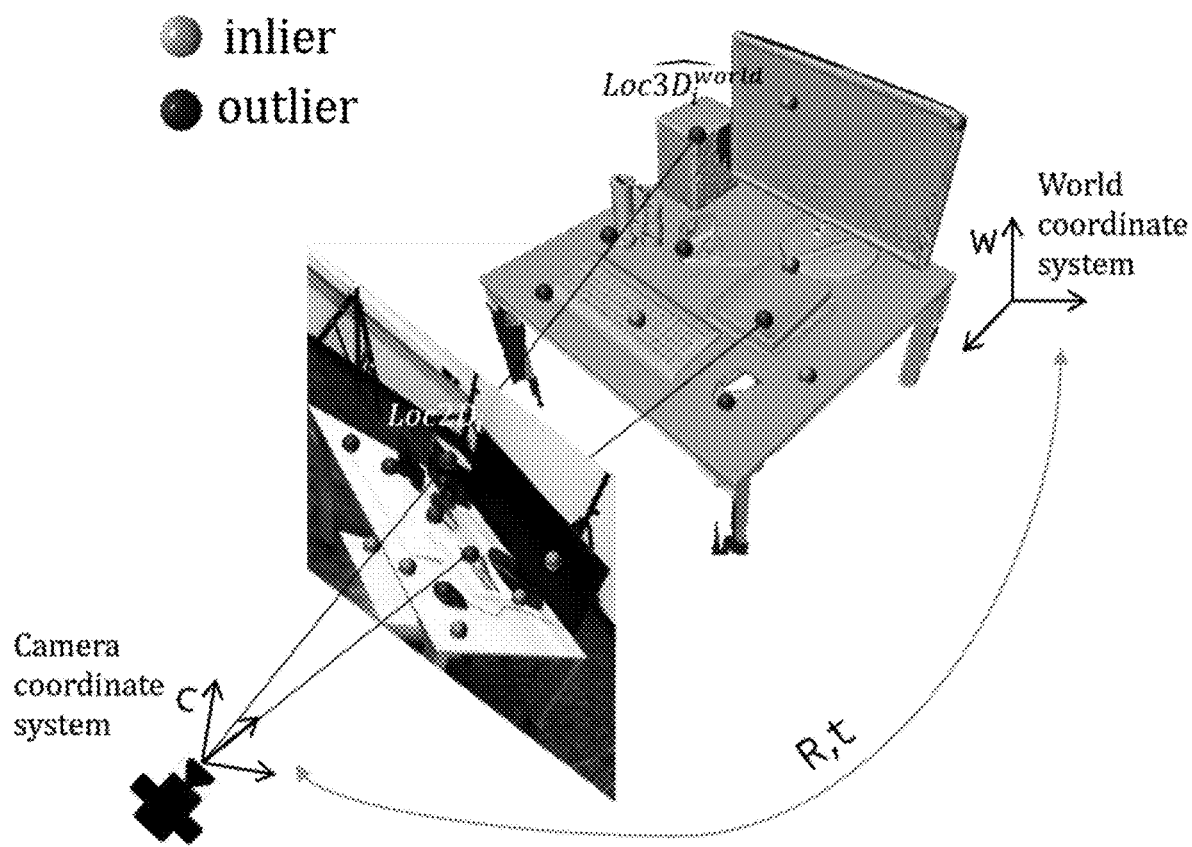
Figure 5:
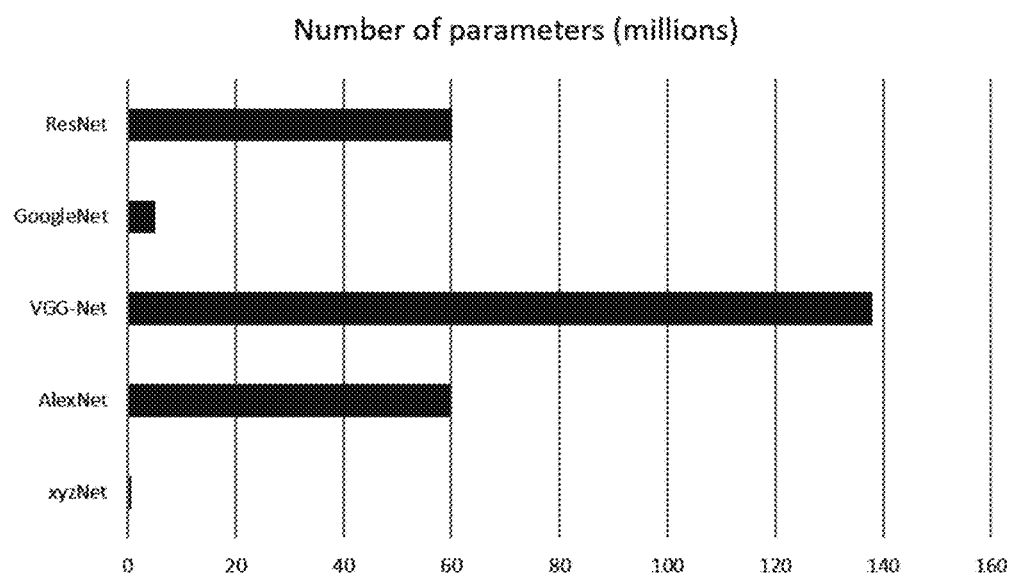
Figure 6:
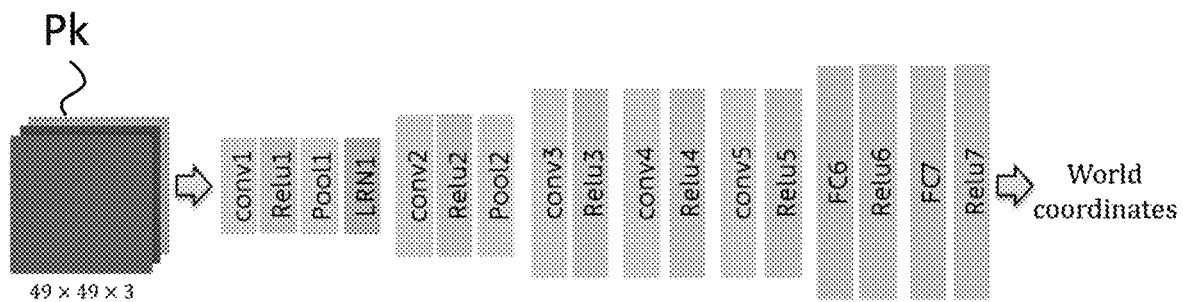
Figure 7:
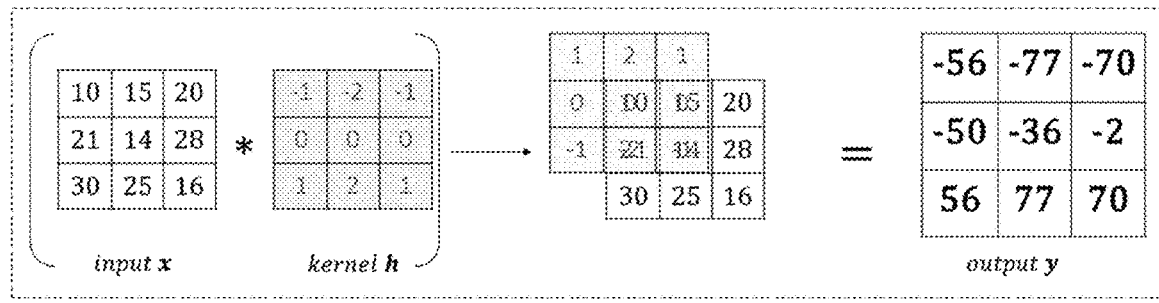
Figure 8:
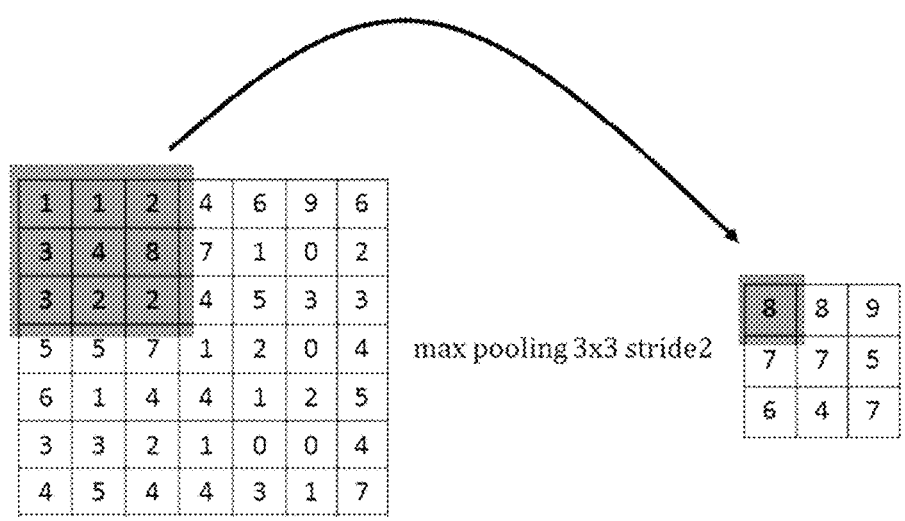
Figure 9:
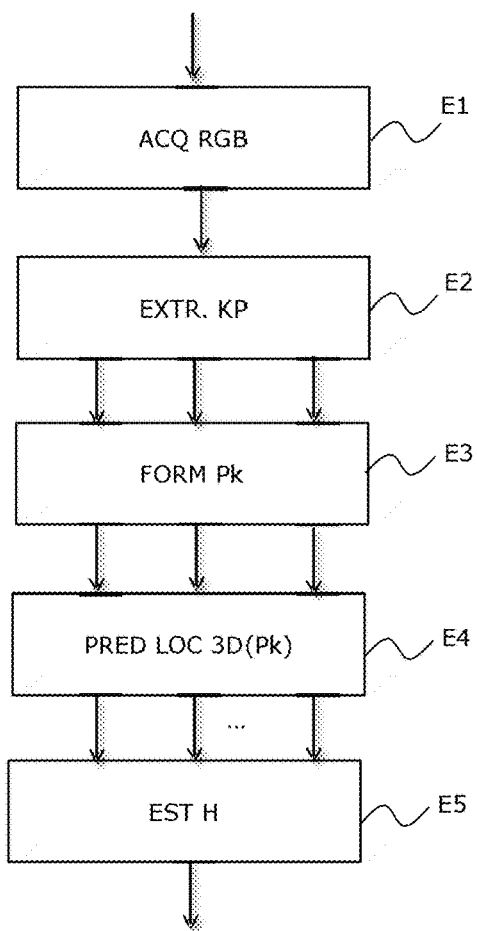
Figure 10:
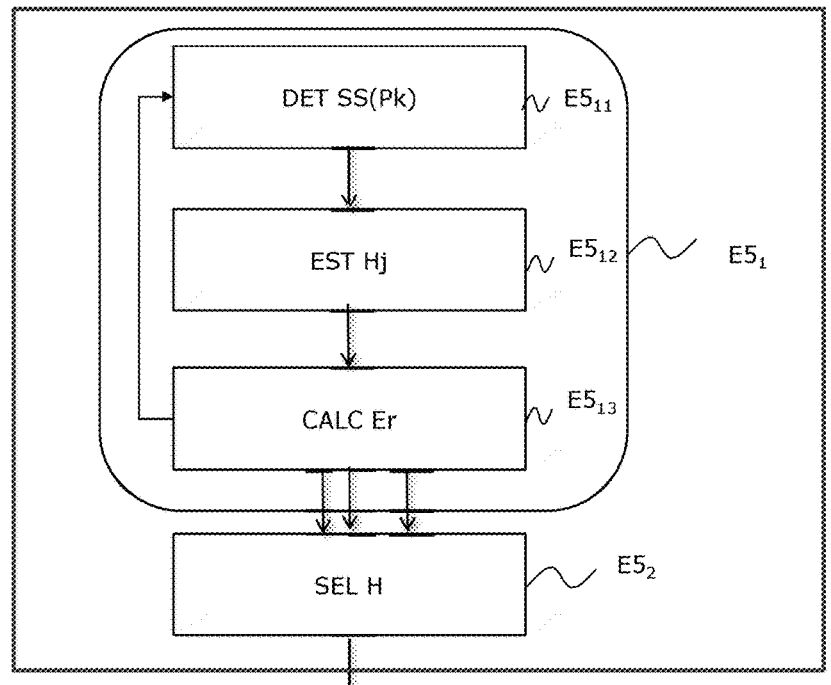
Figure 11:
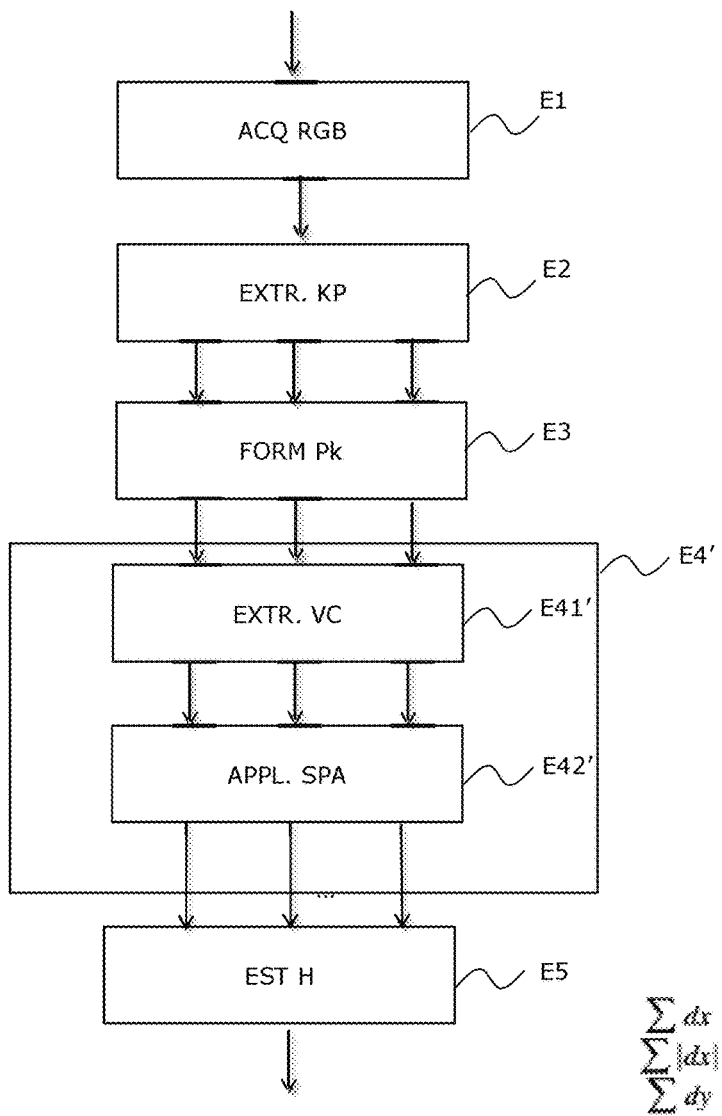
Figure 12:
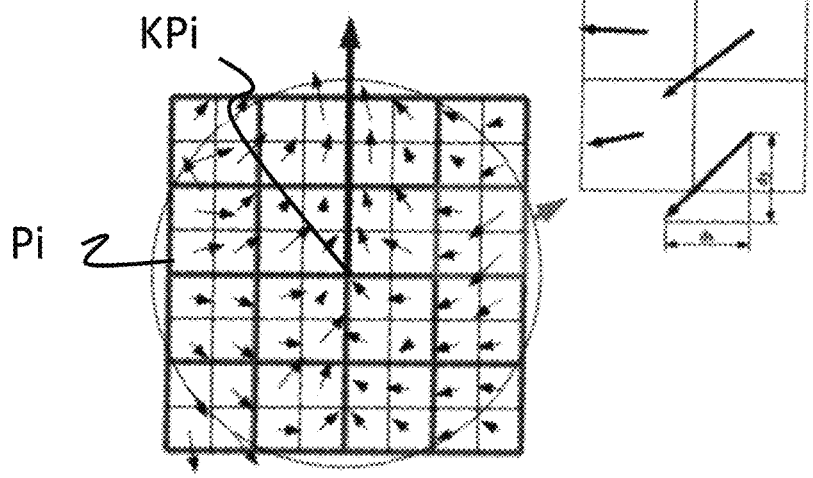
Figure 13:
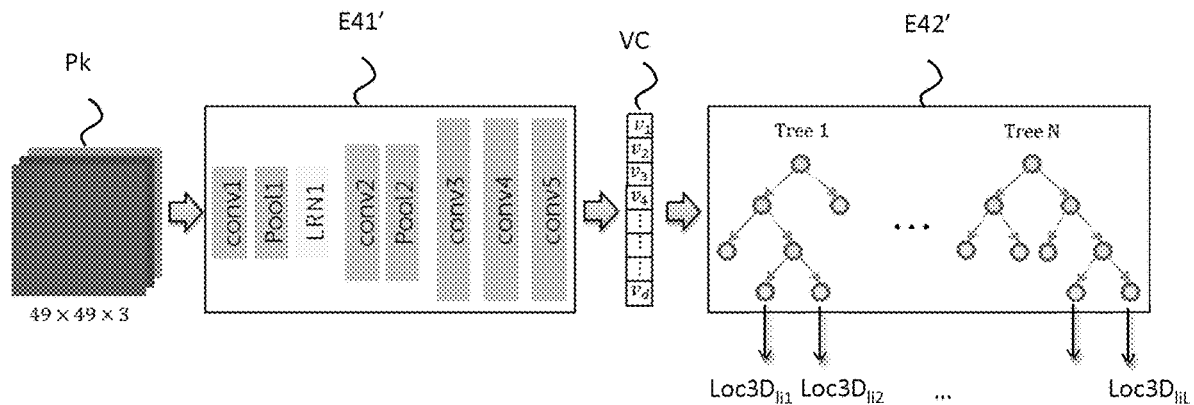
Figure 14:
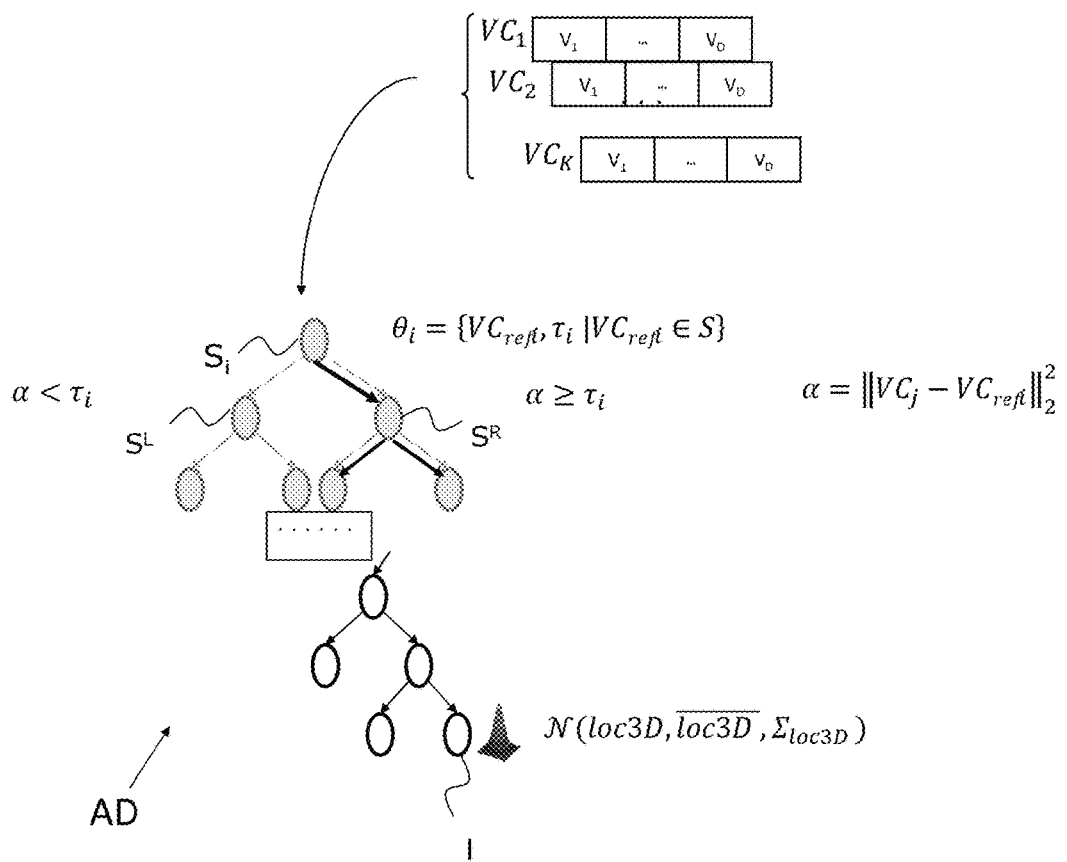
Figure 15:
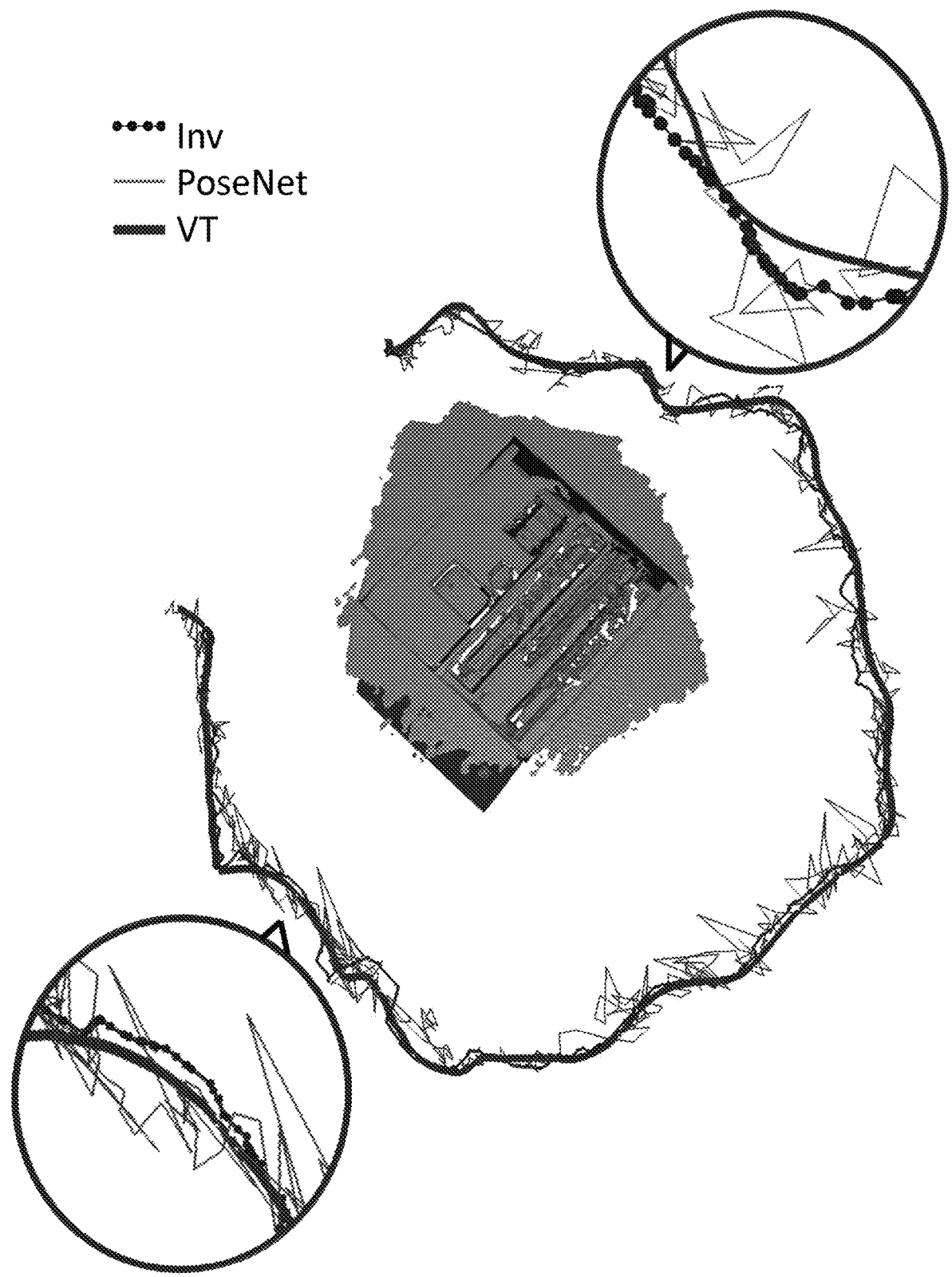
Figure 16:
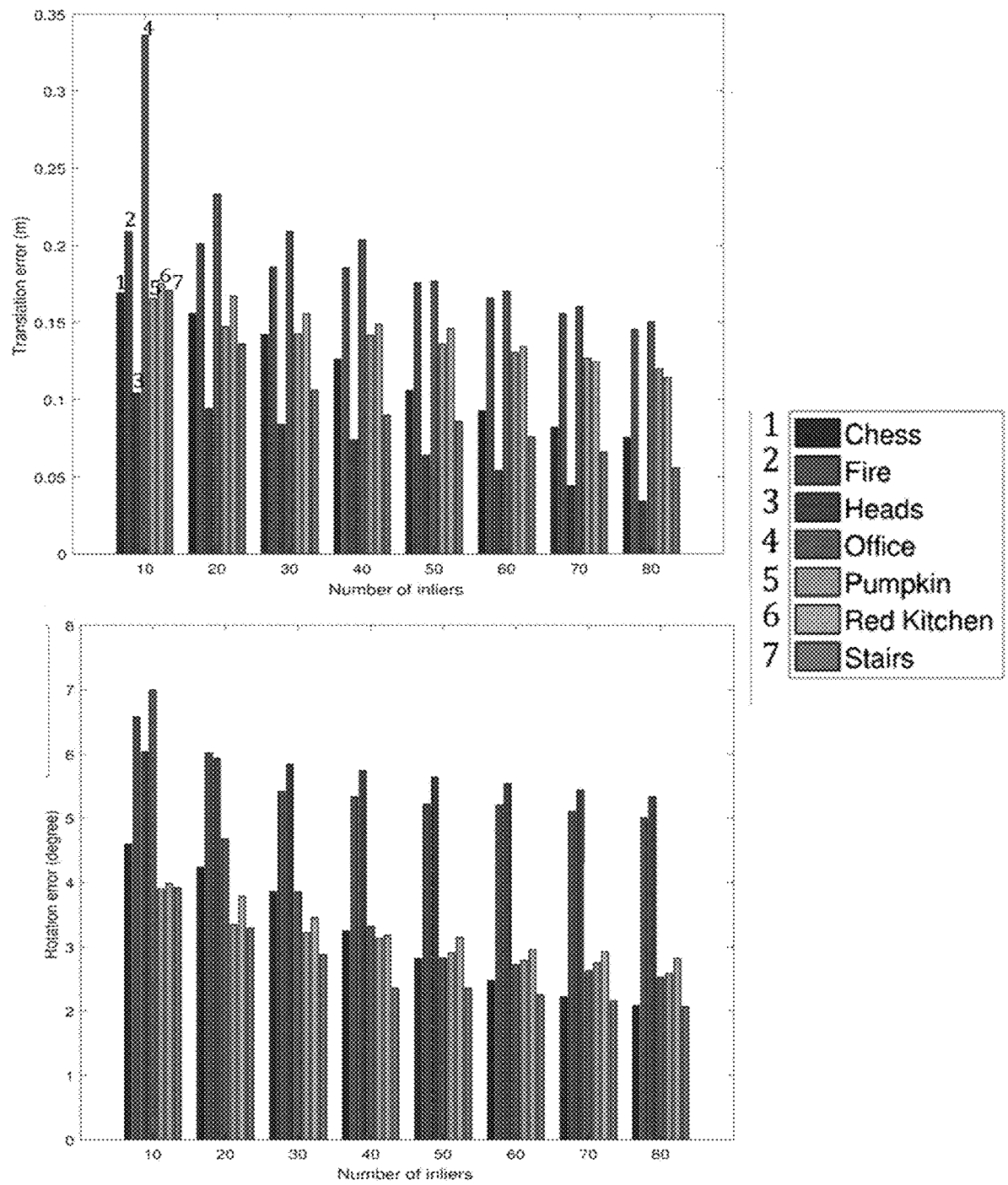
Figure 17:
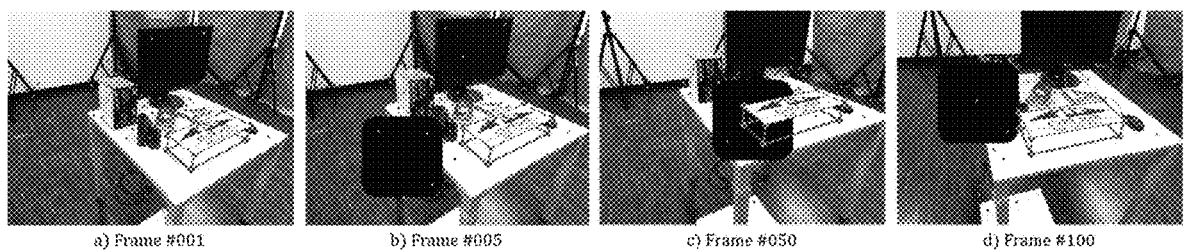
Figure 18:
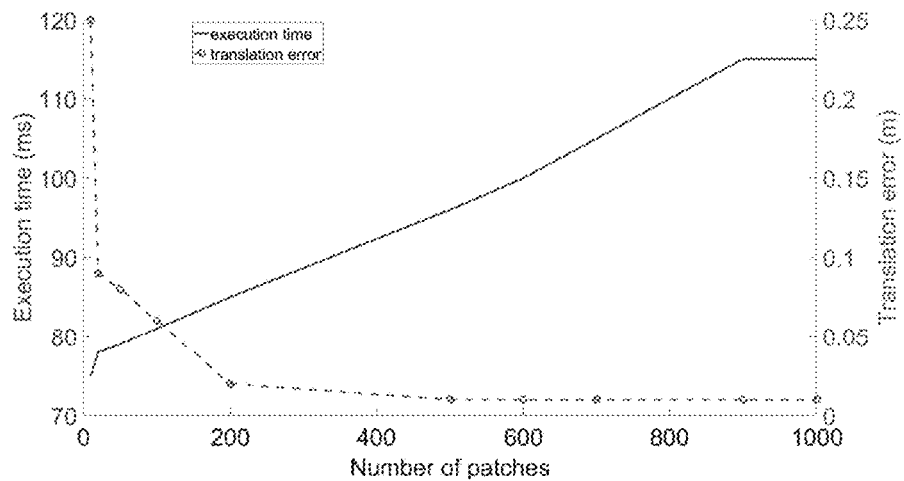
Figure 19:
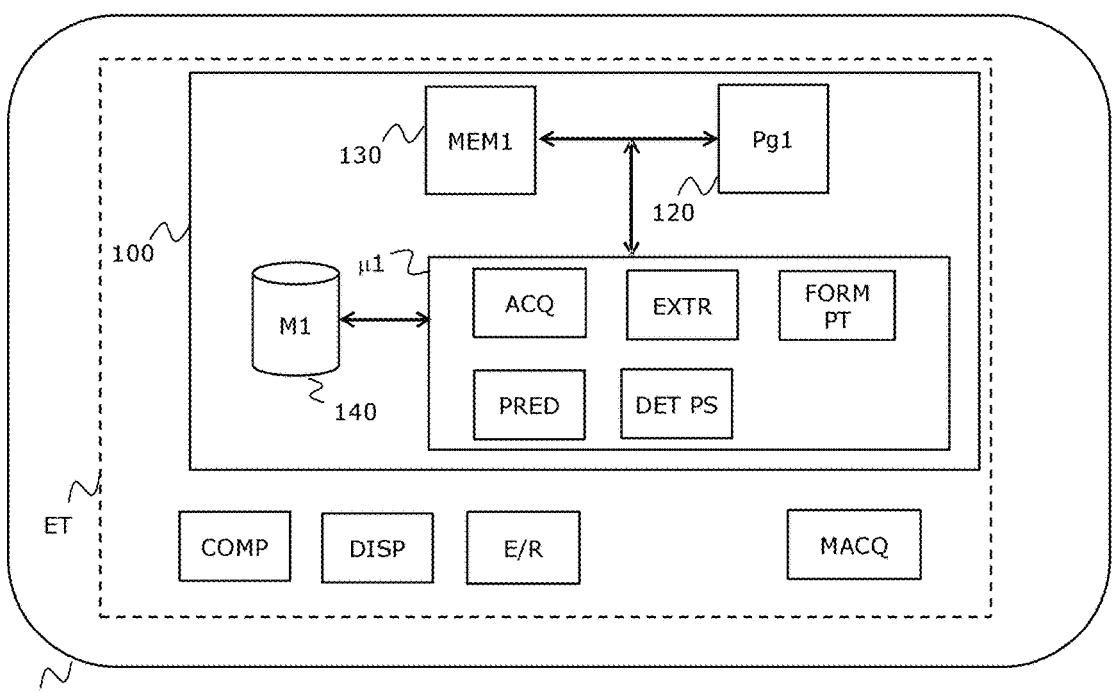

FIG. 4 schematically illustrates a pinhole projection model of an input image point into the camera frame of reference using the depth map and then into the world frame of reference using the H=[R|t] pose;

FIG. 5 compares the complexity of the convolutional neural network implemented in an embodiment of the invention in terms of the number of parameters to those of prior art networks;

FIG. 6 schematically shows the layer structure of the convolutional neural network according to an embodiment of the invention;

FIG. 7 illustrates the principle of convolution layer filtering in a convolutional neural network;

FIG. 8 schematically illustrates the principle of a pooling layer of a convolutional neural network;

FIG. 9 schematically describes the steps of a method for estimating the pose according to a first embodiment of the invention, in a test phase;

FIG. 10 describes in more detail the step of estimating the pose of the input image by matching the 2D and 3D locations of its patches according to an embodiment of the invention and elimination of incorrect predictions ("outliers");

FIG. 11 schematically describes the steps of a method for estimating the pose according to a second embodiment of the invention, in a test phase;

FIG. 12 illustrates an example of a feature vector extracted according to the second embodiment of the invention;

FIG. 13 schematically presents the structure of the automatic prediction system implemented according to the second mode of invention;

FIG. 14 schematically describes the structure of a random decision forest implemented according to the second embodiment of the invention;

FIG. 15 presents a visual reconstruction of the camera trajectory from its estimated pose and compares it to that of the ground truth;

FIG. 16 illustrates the ratio between the number of inliers retained by the method according to the invention and the error of estimation of the camera pose on several scenes;

FIG. 17 illustrates the robustness of the method for estimating the pose according to the invention in the face of a partial occlusion situation;

FIG. 18 illustrates the relationship between prediction computation time, accuracy of exposure estimation and number of patches extracted from the input image; and FIG. 19 schematically describes the material structure of a device for estimating the pose according to an embodiment of the invention.

6. DESCRIPTION OF A PARTICULAR EMBODIMENT OF THE INVENTION

The general principle of the invention is based on the direct prediction of the 3D locations in the scene frame of reference of a plurality of patches extracted from a 2D image of color intensities of the scene and on the estimation of the camera pose by matching the predicted 3D locations with the 2D positions of the patches. This prediction is made using an automatic prediction system that requires training from labelled data with the result of the prediction, during a preliminary phase, called training. Once trained, it can be used on non-labelled input data, in a normal operating mode, known as the test phase.

Figure 1:
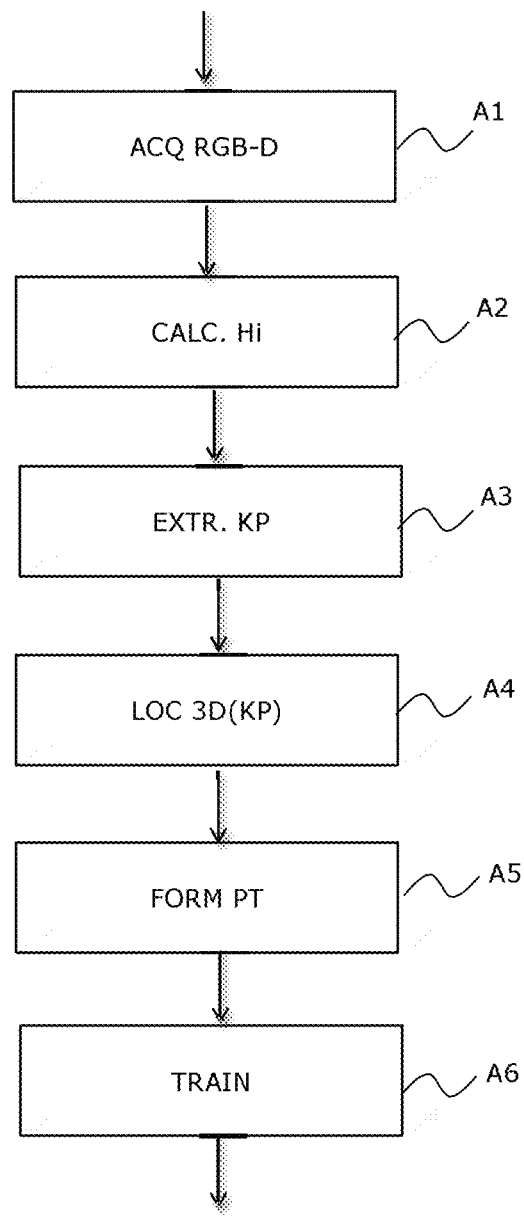

In relation to FIG. 1, the steps of a method for estimating the pose of a camera in a learning phase are described according to a first embodiment of the invention.

In an A1 step, learning data is collected. This data consists of a collection of N frames, with N non-zero integers, which are either acquired directly by an RGB-D camera, capable of providing an image of colour intensity $I^C$ and its associated depth $I^D$ image, or obtained from a public database. This training data also includes a camera pose in the world repository, associated with each of the images in the collection. N is, for example, between 100 and 2000.

For example, the teaching data are acquired by a MACQ acquisition module consisting, for example, of a "Kinect.v2®" system, a registered trademark, capable of simultaneously acquiring color and depth intensity images and the associated camera pose. This system includes an RGB sensor capable of generating an image with a resolution w=1920×h=1080 pixels at 30 Hz and a depth D sensor capable of capturing an image with a resolution of 512×424 with the same frequency. The color intensity image and the depth image are then aligned so that they have the same dimensions w, h and correspond to a single point of view of the RGB-D camera.

The Kinect.v2 system also comprises a laser transmitter and an infrared camera. The laser generates a modulated wave which is captured by the infrared camera. A time of travel of the wave between the transmitter and an object in the scene is calculated and then used to deduce a distance between the transmitter and the object.

Figure 2:
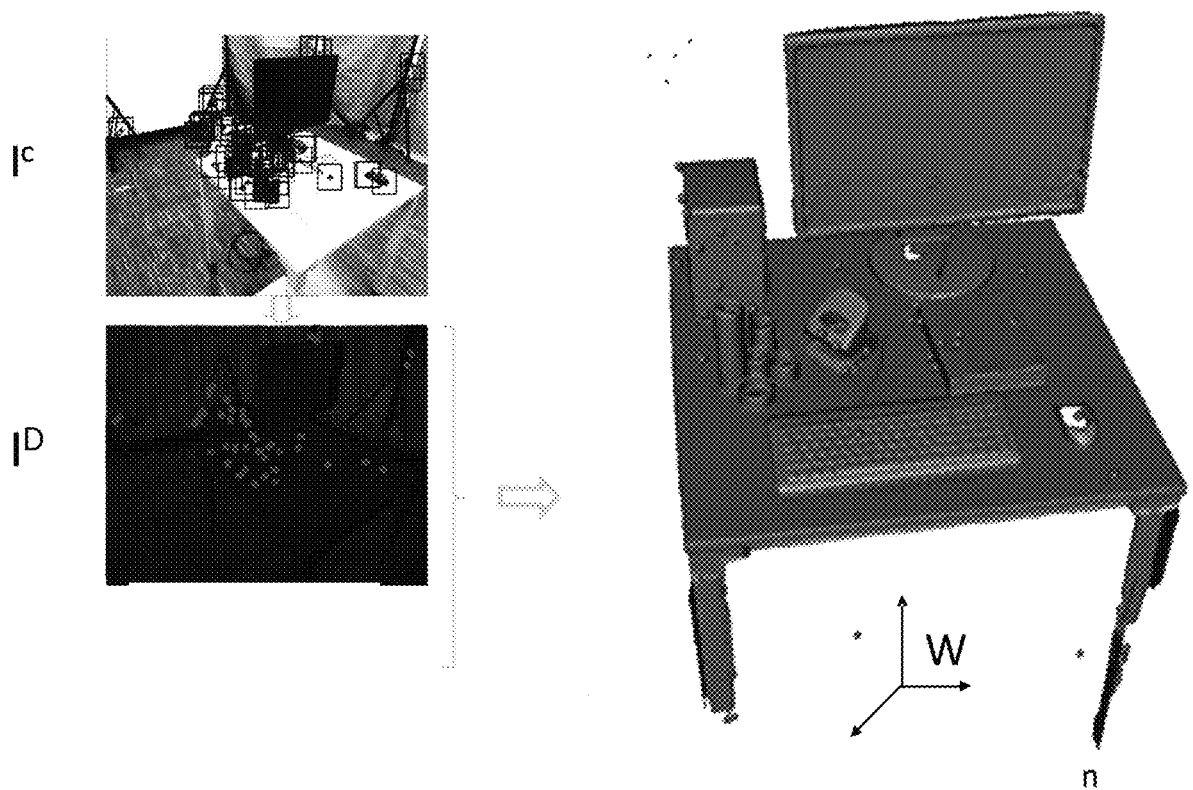
FIG. 2 shows an input RGB image from which key points were extracted and patches were formed around these key points.

In the following, a pair of images acquired by the RGB-D camera is designated by ($I_i^c$, $I_i^D$) with i being an integer between 1 and N. An example of an image pair ($I_i^c$, $I_i^D$) is shown in FIG. 2.

According to the previous example, the camera pose is obtained in A2 using an annotation module capable of calculating a pose associated with each pair of camera images. For example, this is a trademarked "KinectFusion®" module included in the "Kinect.v2 ®" system, the operating principle of which is described, for example, in the paper by Newcombe et al. entitled "KinectFusion: Real-time Dense Surface Mapping and Tracking", by the IEEE International Symposium on Mixed and Augmented Reality (ISMAR), 2011. This system is based on a real-time 3D dense reconstruction method using Simultaneous Localization and Mapping (SLAM). Such a technique makes geometric and temporal assumptions about the scene. It considers a pair of input images, extracts points of interest and maps them, which allows it, by solving a linear system of equations, to precisely determine the camera pose and to reconstruct a 3D model of the scene $L_M$.

This module therefore provides the camera's $H_i$ exposure values associated with each moment of acquisition of a pair of RGB-D $I_i^c$, $I_i^D$ images. This information constitutes a "ground truth" necessary for learning the 3D patch location prediction system that will be described below.

Note that there are other exposure annotation systems, which use markers positioned on the RGB-D camera. For example, they are made of a material that offers maximum response to a segmentation module including a laser, which is able to locate them. For example, the CORBS database described in the paper by Wasenmaller et al. entitled "Corbs: Comprehensive RGB-D Benchmark for SLAM using Kinect v2", published by the Applications of Computer Vision conference in 2016, pages 1-7, has been annotated in this way.

Alternatively, the image pair $I_i^c$, $I_i^D$ and its associated Hi pose can also be obtained directly from an image base.

In a manner known per se, the pose of an image pair is expressed for example as $H_i=(Q_i, T_i)$, with $Q_i$ a unitary quaternion comprising 4 rotation components $q_w$, $q_x$, $q_y$, $q_z$ and $T_i$ a vector comprising 3 translation components $t_x$, $t_y$, $t_z$ of the camera in the world reference frame (O, x, y, z).

In step A3, K points of interest KP are extracted from the image of colour intensity $I_i^c$, with K being a non-zero integer, less than the number w·h of pixels contained in the image $I_i^c$. Points of interest, or key points, are points that are invariant to rotations/translations/scale changes. This module detects single points (sparse), for example, using a method called SURF described in Bay et al, "Speeded-up Robust Features (SURF)", Computer Vision and Image Understanding, Issue 110, pages 346-359, 2008. The SURF method exploits a Hessian matrix H(x,σ) defined as follows:

$$\mathcal{H}(x, \sigma) = \begin{pmatrix} L_{xx}(x, \sigma) & L_{xy}(x, \sigma) \\ L_{yx}(x, \sigma) & L_{yy}(x, \sigma) \end{pmatrix}$$

with $$L_{xx}(x, \sigma) = I(x) \times \frac{\partial^2}{\partial^2 x^2} g(\sigma), L_{xy}(x, \sigma) = I(x) \times \frac{\partial^2}{\partial xy} g(\sigma)$$

where I(x) represents the image in which we seek to extract the key points. g(σ) defines a Gaussian with a kernel σ. Convolution of the image with Gaussian is intended to represent the image at several resolutions, in the form of a pyramid of scales. A second derivation is applied to the images of the pyramid $$\left( \frac{\partial^2}{\partial^2 x^2}, \frac{\partial^2}{\partial^2 y^2} \right)$$

which corresponds to an intensity of contrast variation. Concretely, to calculate the second derivatives on the image we use discrete convolutive kernels. In relation to FIG. 3, we have examples of filters that allow us to calculate $L_{xx}$ and $L_{xy}$ respectively.

The determinant of H which is defined as follows:

$$Det(\mathcal{H}) = D_{xx}D_{yy} - (0.9 D_{xy})^2$$

where $D_{xx}$ is an approximation of $L_{xx}$ by a convolution with a discrete nucleus. A maximum response corresponds to a key point KP(x,y,s) whose position in the picture is worth x,y and s corresponds to the scale at which it was extracted. An orientation of this key point is calculated from a Haar wavelet in the directions x,y on a predetermined neighborhood. A principal orientation is calculated as the sum of all wavelet responses over a sector of π/3.

Figure 3:
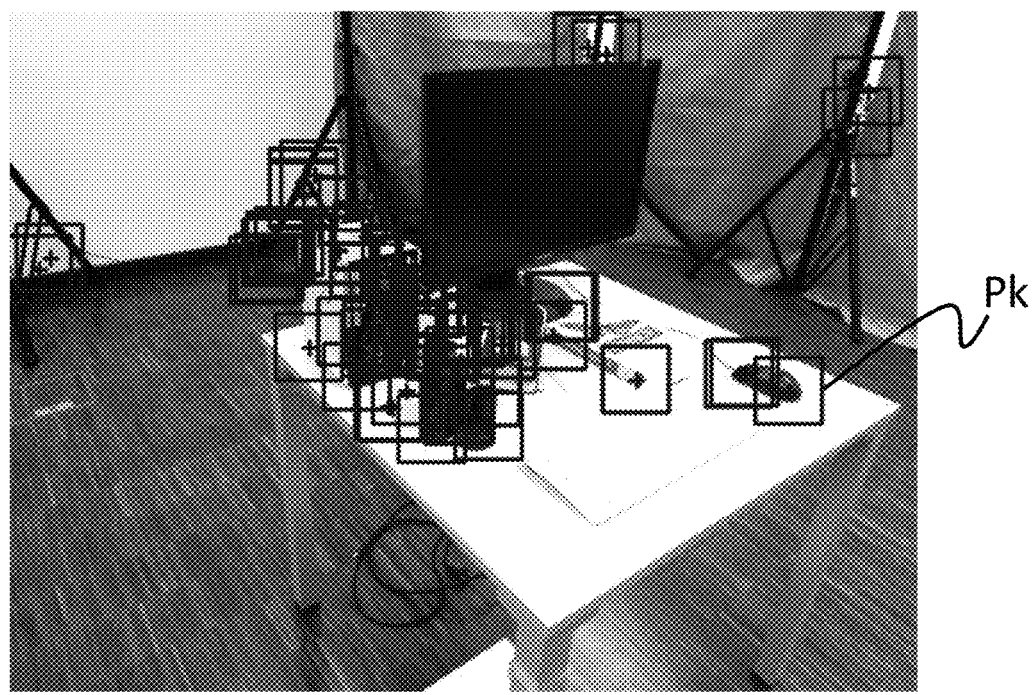
FIG. 3 shows an example of an input RGB image with key points labelled from a depth image acquired by an RGB-D camera and the camera characteristics.

In relation to FIG. 3, an example of points of interest extracted from an $I_i^c$ colour intensity image is shown. Note that these are, for example, points corresponding to significant angles and changes in contrast.

A maximum of 500 points of interest are extracted per image. Each point is assigned its scale value and orientation. The scale value indicates the level of detail and importance of the extracted key point. The orientation indicates the nature of the contrast change.

During an A4 step, we obtain a 3D localization of the points of interest $P_{k,i}$ each pair of patches $(I_i^c, I_i^D)$ in the scene's frame of reference. This is a labeling of the samples of the training set. An example is shown in FIG. 2.

This step, illustrated in FIG. 4, involves first projecting the images $(I_i^c, I_i^D)$ into a camera frame of reference, using intrinsic parameters Q and t of the camera, comprising a projection center $(c_x, c_y)$, a horizontal focal length fx and a vertical focal length fy. Note that in the case of square pixels, we have fx=fy.

From the intrinsic parameters of the depth sensor of the RGB-D camera, each depth value d (represented by two pixel coordinates u, v) is projected into a 3D reference frame of the camera, according to a pinhole projection model known per se, in 3 coordinates (x, y, z) according to the following formulas:

$$\begin{cases} x = \dfrac{d(u - c_x)}{f_x} \\ y = \dfrac{d(v - c_y)}{f_y} \\ z = d \end{cases}$$

It is a simple and linear modeling of the image formation process within a camera. This model assumes that the camera's optical system, i.e. its lens, complies with Gaussian conditions.

You get a triplet $Loc3D_i^{Cam}(x_i^{Cam}, y_i^{Cam}, z_i^{Cam})$ which corresponds to the 3D location of the point of interest in the camera's frame of reference.

Using the camera's Hi pose, comprising the extrinsic parameters of the camera, the intrinsic parameters Q and t already mentioned, corresponding to the ground truth, this point cloud is then projected into the scene's world frame of reference (O,x,y,z), according to a second projection based on a rigid transformation. We obtain the following triplet:

$$Loc3D_i^{World}(x_i^{World}, y_i^{World}, z_i^{World})$$

The input data of the automatic teach-in system then takes the following form: $\{I_i^c, I_i^D, Loc3D_i^{world}\}$ with i ranging from 1 to N, where N is the number of images in the training data collection.

In step A5, illustrated in FIG. 3, patches are then formed, centred on the extracted KP points of interest in each of the images of the couple $(I_i^c, I_i^D)$. In this example, they are all chosen with the same dimensions, equal to 49×49. More generally, the number of points of interest and the size of the patches are advantageously chosen so that a maximum of two patches overlap by 70%. For example, up to 500 patches are considered in an input image with dimensions such as 640×380.

At the end of this step, we have a set of K pairs of patches $(P_{i,k}^C, P_{i,k}^D)$ with k being an integer between 1 and K, annotated by their 3D location $Loc3D_i^{World}(x_i^{World}, y_i^{World}, z_i^{World})$ associated with their original image pair $(I_i^c, I_i^D)$. In the following, we designate by sample $E_{i,k}$ a pair of patches and its associated 3D localization: $E_{i,k} = \{(P_{i,k}^C, P_{i,k}^D), LoC3D_i^{World}\}$.

Steps A2 to A5 are repeated for the N input image pairs.

In a variant of the previous steps, the teach data is collected from a set of RGB-D images acquired from a calibrated camera. This allows a 3D point cloud to be obtained directly for each image in a reference frame of the camera. The camera pose is obtained using a geometrical pose method, such as "Structure for Motion", which performs a triangulation between two successive 2D images. The key points are extracted in a similar way to that described above. The 3D location of the key points in the scene's frame of reference is then determined using the resulting pose.

At the end of step A5, a collection of N·K training samples $\{E_{i,k}\}$ is available.

In step A6, this set of N·K samples $\{E_{i,k}\}$ is presented as an input to an automatic prediction system. In this example of realization of the invention, it is a convolutional neural network, an example of which is shown in FIG. 6.

This convolutional neural network has been specially designed to directly predict the 3D location of the elements of the plurality of patches from an RGB image in the scene frame of reference, from their 2D position in the patch. It uses only RGB image patches of fixed dimensions, for example equal to 49×49 pixels.

The inventors found that known convolutional neural networks, such as AlexNet described by Krizhevsky et al. in the paper "Imagenet classification with deep convolutional neural networks," published in the journal *Advances in neural information processing systems*," in 2012, VGG-Net described by Simonyan et al. in the paper "Very Deep Convolutional Networks for Large-Scale Image Recognition," published in ICLR, in 2014, GoogleNet described by Szegedy et al, in a paper entitled "Going deeper with convolutions" published in the *Proceedings of the IEEE conference on computer vision and pattern recognition, in* 2015, or ResNet described by He et al. in a paper entitled "Deep residual learning for image recognition" published in the *Proceedings of the IEEE conference on computer vision and pattern recognition, in* 2016, are designed to classify objects and are not suitable for processing multiple patches, in terms of computing time, of the order of 10 ms to a few seconds per image). They are generally very deep, i.e. they include a high number of layers and therefore implement a high number of parameters, as shown in the graph in FIG. 5. A consequence of this complexity is a high learning time, of the order of a few weeks for a million images.

The invention provides a lightweight convolutional neural network, referred to as "xyzNet", for locating the K points of interest of an input image in the world coordinate system. This convolutional neural network consists, as shown in FIG. 6, of five CONV convolution layers that constitute five successive stages of the neural network structure. The first two convolution layers are followed by a layer called "RELU" performing a non-linear operation and a subsampling layer called "POOL". Only the first stage includes, following the POOL sub-sampling layer, a response normalization layer called "LRN". The 5 stages thus formed are followed by two stages each comprising a complete neuronal connection layer called "FC" and a RELU layer. To supervise the network, a loss function (for "LOSS") is used, defined by a difference in Euclidean distance between the actual 3D localization of a point of interest (or truth) and its predicted 3D localization.

The different types of layers are now described in more detail:

CONV (for "Convolution"): Each of the five convolutions performs a spatial filtering operation with a set of filters of size 3×3 (conv1: 32 filters; conv2: 64 filters; conv3, conv4, conv5: 128 filters). A convolution layer is described in more detail in relation to FIG. 7. It is a basic block of a CNN network, which is used to extract characteristics from input data. A layer usually consists of several filters. A filter is trained during the training phase to detect the same feature at different positions in the input image and produce a map. The convolution product of the image x and the filter h is defined by the following expression.

$$y[m,n] = x[m,n] * h[m,n] = \sum_{j:-\infty}^{+\infty} \sum_{i:-\infty}^{+\infty} x[i,j] \cdot h[m-i, n-j]$$

POOL (for "Pooling"): the two pooling layers allow sub-sampling with a metric based on the maximum value in a 3×3 size neighborhood. This operation allows, on the one hand, to add a form of invariance to translations and rotations. On the other hand, it reduces the number of parameters used to define the weights of the network in question. FIG. 8 illustrates this operation.

LRN (Local Response Normalization) is an operation to normalize the output of a given layer (by setting the average to zero and the standard deviation to 1) on the set of patches sent in parallel during an iteration (batch). The importance of this operation lies in the convergence quality of the network learning. Indeed, by normalizing, we reduce the rate of variability of the data between them allowing a more restricted behavior of the optimization of the function (by gradient descent for example). This operation can be formalized as follows:

$$\mu_B = \frac{1}{m}\sum_{i=1}^{m} x_i$$

$$\sigma_B^2 = \frac{1}{m}\sum_{i=1}^{m}(x_i - \mu_B)^2$$

$$\hat{x}_i \leftarrow \frac{x_i - \mu_B}{\sqrt{\sigma_B^2 + \epsilon}}$$

$$y_i \leftarrow \gamma \hat{x}_i + \beta$$

Where $\mu_B$ is the average of all patches in Batch B, and $\sigma_B$ designates the standard deviation for the same batch. $\hat{x}_i$ represents the normalized centered signal and $y_i$ defines the final shifted output signal with two parameters $\gamma$ and $\beta$ respectively.

FC (Fully connected) is an operation that aggregates all neural responses obtained from an initial input to form an encoded representation of that input. Our network has two FC layers (FC6, FC7). The first one allows to constitute a dimensional representation (1×1024), and the second one reconstitutes a final representation of the same dimension as the 3D localization that we want to regress or predict, i.e. 1×3. This operation is analytically defined as follows:

$$y_i = W \cdot x_i + b^T$$

Where x and y represent the input and output data representations of the FC layer respectively, W defines the weights to be learned at this layer, and $b^T$ is the bias.

RELU (for "Rectified Linear Unit"), is a non-linear operator that calculates the activation of neurons by a given excitation. In our network, each convolution is followed by a read back layer to introduce a significant non-linearity in the network behavior and to obtain a better discrimination. This correction applies to the standard activation function used previously, which is for example the sigmoid function represented as follows:

$$f(x) = \frac{1}{1 + e^{-x}}$$

This function represents an important limitation for the convergence of learning. It can be rectified as follows:

$$f(x) = \max(0, x)$$

which allows for a more consistent and rapid result in terms of convergence.

Loss function or LOSS: In the learning phase, the weights of the xyzNet network are learned by minimizing a Euclidean lens loss function with a stochastic gradient top-down optimization algorithm. The loss function is then defined as follows:

$$\text{loss} = \Sigma_{k \in B} \text{norm}(loc3D_k^{world} - \widehat{loc3D_k^{world}})$$

This loss function evaluates the quality of the predicted 3D localization. This localization is reduced to 3 coordinates (x,y,z), which makes it easier to optimize it than the one associated with an automatic camera pose prediction system, of the "posenet" type, whose output includes 6 parameters (3 translations and 3 rotations).

In this embodiment of the invention, 500 patches are extracted from each image with the constraint that two patches do not overlap more than 70%. Training patches are normalized by subtracting the average intensity value from all patches.

In relation to FIG. 9, we now describe the method for estimating the pose in its test phase, according to a first embodiment of the invention.

In an E1 step, an input I image acquired by a 2D RGB camera, e.g. with VGA 640×480 dimensions, is obtained. Each picture element consists of 3 intensities R, G and B.

In a step E2, a predetermined number K, e.g. 500, of key points KP is extracted from image I, e.g. using the SURF method described above.

In a step E3, as many patches or $P_k$ patches are formed as key points are extracted, one patch being centered on a key point $KP_k$ and of predetermined dimensions, for example equal to 49×49. At the end of this step, we thus have for image I of K patches $P_k$ with k an integer between 1 and K, to be presented at the input of the automatic prediction system, which is in this example of realization, the convolutional neural network xyznet which underwent the learning phase previously described.

In step E4, the K patches $\{P_k\}$ are processed by the xyznet network, which produces a 3D location prediction per $P_k$ patch: $Loc\widehat{_{3D_k^{World}}}(x_k^{World}, y_k^{World}, z_k^{World})$ In E5, we estimate the pose H=[R|T] (R: rotation, T: translation) of the I-image from the K 3D location predictions of the K patches extracted from the I-image.

In this mode, illustrated in FIG. 10, the E5 pose estimation is performed by generating in $E5_1$ several pose hypotheses from randomly selected subsets among the K locations predicted by the automatic prediction system and by selecting in $E5_2$ the pose hypothesis that minimizes a reprojection error.

Specifically, sub-step $E5_1$ includes:

A random determination $E5_{11}$ of a subset SE of M with 2<M<K points of interest among the K points of interest $KP_k$ of the current image;

An $E5_{12}$ calculation of a Hi pose hypothesis by 2D/3D mapping of the 2D Loc2Dm positions of the M points of interest with their predicted 3D Loc3Dm locations. Only exact predictions of three pixels are theoretically necessary to deduce the camera pose. A well-known computer vision method based on this principle is advantageously used, namely the Perspective-n-Points (PnP) algorithm;

An evaluation of a reprojection error of the 3D locations of the K points of interest KP in the scene frame of reference using the pose assumption H. This error is calculated as follows $$Error(H) = \Sigma norm(Loc2D_k - reproj(Loc\widehat{3D_k^{world}}))$$

Or reproj( ) is a 3D→2D reprojection function defined as follows:

$$reproj(X) = K \cdot H^{-1} \cdot X$$

$$H_n: \begin{pmatrix} R & t \\ 0 & 1 \end{pmatrix}$$

With

Where R and t define the rotation and translation of the camera with its intrinsic K parameters.

Correctly predicted points of interest (inliers) are defined by optimizing the following expression:

$$\max_{H_i} \sum_{j \in B} \rho(\alpha_{ij})$$

$$\alpha_{ij} = norm(Loc2D - K \cdot H_i^{-1} Loc3D\widehat{^{world}}) - \tau$$

Where

We define our function p as follows:

$$\rho(\alpha) = \begin{cases} 1 & \text{if } \alpha < 0 \\ 0 & \text{otherwise} \end{cases}$$

τ is the maximum reprojection error threshold that defines the inliers.

These steps are iterated N times, with N being a non-zero integer, according to a Ransac algorithm (for "Random Sample Access").

In $E5_2$, we select among the hypotheses of pose $H_n$ the best hypothesis of pose H among N obtained, such as the one that obtains the lowest reprojection error Er on its J points of interest defined as inliers.

Taking into account the inliers only eliminates noisy or erroneous predictions provided by the convolutional neural network.

Advantageously, the number of inliers associated with a hypothesis is used to evaluate a confidence measure associated with the estimated camera pose.

For example, it is defined by considering that a number of inliers equal to 80 represents approximately a translation error of 5 cm and a rotation error of 2 degrees on average. These values represent an important threshold of accuracy in augmented reality. A maximum confidence measure of 100% is therefore associated with a number greater than or equal to 80 inliers.

Such an empirical confidence measure allows to inject a probabilistic aspect to the method of estimating the pose according to the invention.

An advantage of the invention is to combine in-depth learning of multiple patches with a filtering method based on PnP and Ransac algorithms to eliminate outliers, e.g. located on moving objects in the scene or partially occluded objects.

In relation to FIG. 11, the method for estimating the pose is now described according to a second embodiment of the invention. In the test phase, steps E1 to E3 are unchanged with respect to the first embodiment described in relation to FIG. 9.

An E4' step for predicting the 3D locations of key points extracted from the input image is now described.

According to this second realization mode, it includes the following sub-steps:

E41' extraction of a feature vector by patch centered on a key point; and

E42' application of the automatic prediction system to obtain a plurality of predicted 3D locations by extracted feature vector.

Step E5 of estimating a camera pose from the plurality of predicted 3D locations is unchanged.

The sub-step of extracting a feature vector by patch can be implemented in different ways. In all cases, a VCi feature vector is extracted from a patch centered on a $KP_i$ key point by an extraction function φ, such as:

$$VC_i = \phi(KP_i)$$

According to a first option, the φ performs an extraction of invariant characteristics from the $KP_i$ key point of the Pi patch, for example according to a SURF type technique already mentioned. Note that according to this first option, the Pi patch formed in E3 is generally 16×16. It is a neighborhood of the KPi key point, which is subdivided into 16 cells of 4×4 pixels. For each of them, the horizontal and vertical wavelet responses of Haar are calculated. dx,dy respectively, as well as the absolute values of these responses. |dx|,|dy|. This gives a vector of 4 values {dx,|dx|, dy,|dy|} per cell. The result is a vector of 64 features that robustly describe variability and orientation of pixel intensities in the vicinity of the KPi key point. FIG. 12 visually illustrates an example of a feature vector obtained with the SURF method.

According to a second option, the φ performs feature extraction using a supervised automatic prediction system. In relation to FIG. 13, the supervised automatic prediction system includes, for example, a CNN2 layered neural network. Advantageously, the CNN2 neural network comprises the plurality of convolution layers of the CNN1 network described in connection with the first realization mode, but, unlike the CNN1 neural network, it does not comprise FC connection layers. For example, the resulting feature vector VCi comprises 2048 features.

The training of the CNN2 neural network is advantageously carried out from a training set described in the first embodiment and with the help of the CNN1 neural network. As a reminder, this training set associates to a plurality of input patches the plurality of expected 3D localizations, or ground truths.

Once the learning is done, you just have to remove the connection layers to get the CNN2 network. The sub-step E42' advantageously applies an automatic prediction system of the random decisional forest type that will be referred to in the following as 'DeepForest. The random decision forest technique is known to the professional and is described, for example, in the paper by Shotton et al. entitled "Scene Coordinate Regression Forests for Camera Relocation in RGB-D images", published by the IEEE Conference on Computer Vision and Pattern Recognition in 2013. The invention, in its second mode of implementation, adapts a decision forest to predict the 3D location of key points in a 2D image. The specificities of the DeepForest decisional forest will now be described in relation to FIG. 14.

A random decision forest consists of several trees, typically M, with non-zero integer M.

Each tree $AD_m$, with integer m between 1 and M, receives a randomly selected subset of a collection E of training samples. A tree consists of intermediate nodes S, at which it splits into two branches, leading to two left and two right child nodes $S^L$, $S^R$ respectively. A simple binary test h is performed at each intermediate node S. Depending on its result, a data sample and its associated label or ground truth are directed to the left or right child node.

The parameters θi of the binary test h applied at a node Si are randomly generated during teach-in. At the end of this phase, the parameter values are chosen which achieve an optimal separation of the samples at a non-leaf node. One criterion is in particular that it produces two groups that are homogeneous from the point of view of their 3D localization value.

According to the invention, a data sample comprises a feature vector $VC_k$ and its associated label, namely the Loc3D location of the corresponding $KP_k$ key point in the world repository.

Typically, input samples consist of multiple components or channels of data, and the binary test applies to data of a randomly selected channel in a sample. For example, it is a difference between two pixel values in an intensity image.

According to the invention, the binary test hi at the node Si is performed on all the components of the vector of characteristics $VC_k$, as follows:

$$hi(VC_k, \theta i) = \begin{cases} 0, & si\ d(VC_{Refi}, VC_k) < \tau_i\ \text{Go to the left thread node} \\ 1 & \text{if not go to the right thread node} \end{cases}$$

Where $d(VC_{Refi}, VC_k) = \|VC_{Refi} - VC_k\|_2^2$ is a Euclidean distance, Refi a vector of reference features randomly selected from the training set, and $\tau_i$ a randomly generated threshold for the Si node whose value is optimized during training.

The decisional forest proposed by the invention differs from the prior art in that it exploits the entirety of the components of the vector and compares them to another vector of the input data set. An advantage of applying an integral binary test is that it allows finer discrimination of the patches between them, because it relies on more characteristics.

The Refi reference vector and the threshold $\tau_i$ are part of the parameters θi of the binary test hi:

$$\theta_i = \{VC_{Refi}, \tau_i | \text{ref}_i \in E\}$$

A learning supervision consists in globally evaluating all the separations made by the θi parameters at the level of each node If not leaf using an objective function or loss function Q defined as follows $$Q(S_i, \theta_i) = \sum_{d \in \{L, R\}} \frac{|S_i^d(\theta_i)|}{|S_i|} V(S_i^d(\theta_i))$$

Where L denotes the set of right nodes and R the set of left nodes and $$V(E) = \frac{1}{S}\Sigma_{m \in E} \|m - \overline{m}\|_2^2$$

with m the Loc3D coordinates in the world frame associated with the feature vector and $\overline{loc3D}$ the average of the Loc3D coordinates of the E. d set designates the left L or right R direction of the separation.

The aim is to minimize the value of Q in order to reduce the spatial variance of 3D locations stored at a non-leaf node.

The lower the Q value, the more compact the 3D location subgroup is. Each non-leaf node is searched for the optimal test that minimizes Q and thus maximizes a measure of data clustering purity performed by the Si node.

This calculation is done at each intermediate node of an AD decision tree.

The terminal nodes are called I-leaves. The tree forms optimal groups of $GO_i$ samples, with I being an integer between 1 and L, where L is the number of leaves in a tree, which it stores at its leaves.

The learning process includes a plurality of iterations during which the values of $VC_{refi}$ and $\tau_i$ are randomly selected. It terminates when certain predetermined stopping conditions are met, such as when the data reaches a predetermined maximum depth of the tree or when the number of samples falls below a threshold allowing the creation of leaves.

Advantageously, an additional constraint can be introduced in relation to the development of a balanced tree. This reduces the depth of the tree and thus the prediction time in the test phase. For this purpose, a separation of the sample group at a Si node in the upper part of each tree into two subgroups of equivalent size is imposed using θi parameters of the following form:

$$\theta_i = \{VC_{Refi}, \tau_i | |S_i^L| = |S_i^R|\}$$

Each intermediate or non-sheet Si node stores in memory the optimal parameters θi* for the hi* binary separator test that it applies to the data.

Each sheet I stores a Gaussian distribution of all 3D locations in its optimal group, expressed as follows:

$$N(loc3D, \overline{loc3D}, \Sigma_{loc3D})$$

Where m designates the group of 3D locations stored by the sheet, $\overline{loc3D}$ is the average of the 3D locations stored by the sheet I and $\Sigma_{loc3D}$ the 3×3 matrix of their covariance. At the end of the learning phase just described, each leaf of the M ADm decision trees of the forest stores the Gaussian distribution of the 3D locations of its optimal group.

In a test phase, each vector of features VCj associated with a key point KPj of a patch Pj of an image I passes through the random decision forest. It is processed in parallel by each tree ADm. The vector is directed by the successive binary tests to a leaf l of each tree ADm. The 3D location predicted by this tree corresponds to the Gaussian distribution stored in this leaf. The set of 3D location predictions obtained by the forest corresponds to the set of locations predicted by each tree.

Note that for scenes containing repetitive patterns, it may be difficult to obtain an accurate location of the patches in the world frame. Nevertheless, the method of the invention produces a set of possible locations to resolve such ambiguity. In addition, the covariance matrix $\Sigma_{loc3D}$ available at the level of each sheet provides accuracy information associated with each 3D location prediction. This measurement is then used during an E5' step to estimate a camera pose from the predicted 3D locations.

According to this second embodiment of the invention and in relation to FIG. 10 already described, the pose estimation step includes a sub-step E50' of filtering the 3D locations predicted by the M trees of the decision forest. Advantageously, for each of the K patches of the input image, this sub-step compares the trace of the covariance matrix $\Sigma_{loc3D}$ associated with the 3D localization predicted by an ADm tree at a threshold $\tau_{cov}$ threshold and removes it if the trace of the associated covariance matrix is greater than or equal to the predetermined threshold. $\tau_{cov}$. For example, $\tau_{cov}$ is chosen equal to 0.05. Otherwise, the average $\overline{loc3D}$ of the Gaussian distribution of this prediction, because the Gaussian distribution of the prediction produced by the tree is sufficiently compact.

Thus, at the end of this sub-step, we have a subset of the average K·M $\overline{loc3D}$ predicted 3D locations that are transmitted to the E5$_1$ sub-steps for generating a plurality of exposure hypotheses from subsets randomly selected from the locations predicted by the automatic prediction and selection system E5$_2$ of the exposure hypothesis that minimizes a reprojection error. These sub-steps remain unchanged from the first embodiment.

We now present performance measurements of the method for estimating the pose according to the invention in its different embodiments.

We consider 7 distinct scenes on the scale of a room. These scenes have geometrically complex trajectories involving pure rotations, abrupt changes of direction and rapid camera movements.

Each scene consists of sequences that are captured around a single piece and annotated using Kinect Fusion, as described above.

In addition, the CORBS database described in the paper by Wasenmüller et al. entitled "Corbs: Comprehensive RGB-D Benchmark for SLAM using Kinect v2", published by the Applications of Computer Vision conference in 2016, pages 1-7, is considered. It includes a set of data that is more accurately annotated using a multi-sensor system. Visual data is archived using Kinect v2. The ground truth for the trajectory is obtained by an external motion capture system. Each scene contains a dense 3D scene model obtained via an external 3D scanner. The images considered here are 640× 480 pixels in size.

TABLE 1

| Scene | PoseNet-1 | PoseNet-2 | xyzNet | Deep-Forest | SURF-Forest |
|---|---|---|---|---|---|
| Chess | 0.32 m-8.12° | 0.13 m-4.48° | 0.18 m-4.80° | 0.03 m-1.40° | 0.03 m-1.45° |
| Fire | 0.47 m-14.41° | 0.27 m-11.31° | 0.21 m-6.72° | 0.02 m-1.16° | 0.03 m-1.34° |
| Heads | 0.29 m-12.02° | 0.17 m-13.03° | 0.15 m-8.08° | 0.03 m-1.79° | 0.02 m-1.32° |
| Office | 0.48 m-7.68° | 0.19 m-5.55° | 0.42 m-9.59° | 0.05 m-1.96° | 0.04 m-1.70° |
| Pumpkin | 0.47 m-8.42° | 0.26 m-4.47° | 0.17 m-4.18° | 0.05 m-1.60° | 0.05 m-1.70° |
| Red Kitchen | 0.59 m-8.84° | 0.23 m-5.35° | 0.20 m-4.65° | 0.03 m-1.15° | 0.05 m-1.97° |
| Stairs | 0.47 m-13.81° | 0.35 m-12.41° | 0.19 m-4.63° | 0.06 m-1.48° | 0.07 m-2.05° |
| Average | 0.44 m-10.43° | 0.23 m-8.13° | 0.22 m-6.09° | 0.04 m-1.51° | 0.04 m-1.65° |

Table 1 compares the performance in terms of accuracy of the method fro estimating the pose to that of the previous art methods for 7 scenes. The results presented include the average translation error in cm and the rotation error in degrees. The term "xyznet" refers to the first embodiment of the invention, the term "SURF-Forest" refers to the second embodiment option 1, i.e. with SURF-based feature extraction, and the term "Deep-Forest" refers to the second embodiment option 2, i.e. with CNN-based feature extraction.

It can be seen that the method according to the first embodiment of the invention gives on average more precise results than the prior art, but is less efficient on certain scenes such as "Office" or "Chess", which contain repetitive motifs. The second embodiment, on the other hand, is always more efficient than the prior art and the first embodiment of the invention. This is explained in particular by the production of a plurality of 3D locations predicted by patches, which are then filtered using covariance measurement and then used by the Ransac and PnP algorithms to estimate the camera pose.

TABLE 2

| Processing time | Extraction key points | Feature vector extraction | 3D location prediction | Estimation of the camera pose | Total |
|---|---|---|---|---|---|
| xyzNet | 10 ms | 0 ms | 25 ms | 25 ms | 60 ms |
| Deep-Forest | 10 ms | 25 ms | 20 ms | 25 ms | 80 ms |
| SURF-Forest | 10 ms | 5 ms | 10 ms | 25 ms | 50 ms |

Table 2 compares the processing times of the different modes of implementing the invention. It can be seen that the second embodiment option 1 (SURF-Forest) is the fastest in terms of processing time, thanks to reduced feature extraction and prediction times.

The second embodiment option 2 (Deep-Forest) is the most expensive in computing time, but it remains real time. The processing time increases linearly with the size of the images.

In relation to FIG. 15, a reconstruction of the camera's TE trajectory from the estimated poses according to the invention is presented and visually compared with the TVT of the ground truth. The difference observed between the two trajectories corresponds to the estimation error of the order of a few centimeters.

In relation to FIG. 16, the impact of the number of inliers on the accuracy of the estimated pose is illustrated. It shows the proportional relationship between the number of inliers and the precision on the estimated laying accuracy. For a given scene, e.g. "Chess" the error for translation is 0.17 cm for 10 inliers against 0.07 cm for 80 inliers. This result is directly related to the minimization of the error by PnP which estimates a better hypothesis of camera pose with a higher number of inliers.

This confirms the fact that the number of inliers is a relevant information to define a confidence measure of the camera pose estimation performed.

In connection with FIG. 17, the ability of the method according to the invention to deal with partial occultation is illustrated. For this purpose, degraded input images are presented comprising a black rectangular ZRN area of size 200×200. The area changes position from one image to another. It can be seen that regardless of the position of the masking area, the estimation of the camera pose remains correct. Indeed, we can see that the synthetic OS object in the shape of a rectangular parallelepiped remains correctly inserted in the scene whatever the position of the ZRN masking zone.

These good results can be explained by the fact that the method according to the invention is based on correctly predicted inlier points derived from patches located outside the degraded area. This "sparse" approach provides a robust solution to partial image occlusion and allows to continue to provide a robust and accurate estimation of the camera pose while the input image is visually highly degraded.

Note that the result obtained is likely to be associated with a lower confidence measure due to a smaller number of inliers.

The problem of partial occultation being very frequent in real scenes, the robustness of the approach according to the invention is an asset for a dynamic environment.

In relation to FIG. 18, the prediction calculation time is presented as a function of the number of extracted patches. It also illustrates the impact of the number of patches used on the quality of the prediction. Approximately 130 patches produce an error of about 0.05 m for an execution time of 80 ms corresponding to about 13 fps. This execution time is short which demonstrates the low complexity of our approach due directly to the convolutional neural network architecture allowing a fast inference time and sufficient discrimination and generalization for a good 3D localization.

The invention thus proposes an approach based on a convolutional neural network that allows regressively estimating the 3D localization of points of a 2D image acquired by an RGB camera in an unconstrained environment. Contrary to previous art, the training samples are collected in a non dense way in the form of a plurality of patches centered on key points of an intensity image acquired by the camera. The results obtained, especially in terms of translation and rotation errors, from public databases validate this approach and show that it is more accurate than the methods of the prior art, while remaining real time and simple to configure.

It should be noted that the invention just described can be implemented by means of software and/or hardware components. From this point of view, the terms "module" and "entity", used in this document, may correspond either to a software component, a hardware component, or a set of hardware and/or software components, capable of implementing the function(s) described for the module or entity concerned.

In connection with FIG. 19, an example of a simplified structure of a device for estimating the pose of a camera according to the invention is now presented. Device 100 implements the pose estimation method according to the invention just described.

This FIG. 19 illustrates only one particular way, among several possible ways, to realize the algorithm detailed above. Indeed, the technique of the invention is implemented either on a reprogrammable computing machine (a PC computer, a DSP processor or a microcontroller) configured to execute a program comprising a sequence of instructions, or on a dedicated computing machine (for example a set of logic gates such as an FPGA or an ASIC, or any other hardware module).

In the case where the invention is implemented on a reprogrammable computing machine, the corresponding program (i.e. the sequence of instructions) may or may not be stored in a removable storage medium (such as, for example, a floppy disk, CD-ROM or DVD-ROM), this storage medium being partially or totally readable by a computer or a processor.

For example, device 100 comprises a processing unit 110, equipped with a µ1 processor, and driven by a Pg1 computer program 120, stored in a memory 130 and implementing the method of according to the invention.

During initialization, the code instructions of the Pg1 120 computer program, for example, are loaded into RAM memory before being executed by the processor of the 110 processing unit. The processor of the processing unit 110 implement the steps of the method described above according to the instructions of computer program 120.

In this example of a realization of the invention, device 100 comprises a reprogrammable computing machine or a dedicated computing machine, capable of and configured for:

Obtaining a CQI image of the color intensity of the scene captured by the camera, called the current image;

Extracting EXTR a plurality of points of interest from the current image, a said point being invariant by geometric transformation of the image;

Forming FORM PT a plurality of patches in the color intensity image, one patch including a point of interest of the extracted plurality;

Predicting PRED of the 3D locations of the points of interest of the plurality of patches in a frame of reference of the scene, by application of an automatic prediction system, said system having been trained with the aid of a training set comprising patches from a plurality of images of the scene acquired by the camera from a plurality of viewpoints, a patch being associated with a 2D position of its point of interest in a frame of reference of the image and with a 3D position of its point of interest in the frame of reference of the scene;

Estimating EST H a camera pose for the current image, by mapping the 2D positions of the plurality of points of interest and reprojections in the current image frame of reference of the predicted 3D locations.

Advantageously, the computing machine is configured to implement the embodiments of the invention that have just been described in relation to FIGS. 1, 9 and 11.

In particular, it is furthermore capable of implementing the learning phase and the test phase of the automatic prediction system according to the invention as previously described. It is then configured for:

- Obtaining a training set comprising a plurality of colour intensity images of the scene acquired by the camera, from a plurality of viewpoints, one viewpoint being associated with a known pose of the camera;
- Extracting a plurality of points of interest from said color intensity image, one said point being associated with a 2D position in the intensity image and a depth in the depth image;
- Obtaining 3D locations of the plurality of points of interest in the scene's repository;
- Driving the automatic pose prediction system from pairs of patches, a patch pair being associated with the 2D position of its point of interest in an image frame of reference and the 3D location of its point of interest in the scene frame of reference.

Device 100 further comprises an M1 140 storage unit, such as a memory, for example of the buffer type, capable of storing for example the predicted 3D locations of the plurality of key points and/or the estimated Hn pose hypotheses and the inlier points obtained according to the PnP—Ransac technique described in relation to FIG. 10.

These units are controlled by processor µ1 of Processing Unit 110.

Such a system for estimating the pose can be advantageously integrated into an augmented reality system.

Such a system 10 comprises, in addition to the device 100, at least one MACQ acquisition module for input images, comprising for example an RGB camera capable of capturing an image of a real scene, an ANNOTATION module capable of producing 3D locations of points of interest of the images, a COMP composition module capable of composing an output image, said "augmented" from an input image of the scene acquired by the camera and at least one real or virtual object, as shown in FIG. 14, using an initial position of said at least one object in the scene and an estimated pose of the camera and a display DISP module capable of rendering the output image.

In one variant, the 100 device, once trained, can be integrated into AND terminal equipment, such as a personal computer, which can be mobile, like a tablet or smartphone, and is itself included in System 10.

Device 100 is then arranged to cooperate with at least the following modules of system 10 or ET terminal equipment:
- a data transmit/receive E/R module, through which an RGB image is obtained, e.g. from a remote database; and/or
- the MACQ acquisition module of the input image sequence, such as an RGB video camera, for example via an HDMI cable;
- the ANNOT annotation module capable of producing the 3D locations of the plurality of points of interest extracted from an input image, for example of the Kinectfusion® type;
- the DISP display device, configured to render a composition of a 2D RGB image with the virtual or real 3D scene using the estimated camera pose.

Thanks to its good performance and simplicity of implementation, the invention just described has several uses. A first application is to increase the reality of a scene filmed by the RGB-D camera, by injecting additional objects, virtual or real. For example, we know of an application for interior decoration, which allows a customer to virtually test the layout of furniture in a room in his apartment before deciding to buy it. This application requires an estimation of the camera's position in a reference frame of the room, in order to locate the image it acquires in the scene and to insert the virtual furniture with the right dimensions and the right perspective when it is displayed on a display device. A spatial position of the virtual furniture is initialized in the scene. It requires an a priori knowledge of a 3D structure of the room. Then, a follow-up of the camera trajectory is carried out by estimating its position in a reference frame of the scene according to the invention, which allows, for each new image acquired, to project the virtual furniture in the scene, in the right position and with the right perspective. With the invention, because the processing is less complex and does not require in its test phase a depth camera, it becomes possible to implement this application on a mobile terminal equipment, such as a tablet or smartphone.

A second application envisaged is the assistance of a maintenance operator, for example of aircraft. It is assumed that he acquires an image of engine parts from a mobile terminal equipment, such as a tablet. The system according to the invention enables him, in his test phase, to estimate the camera position in the scene constituted by the aircraft engine from the current image. The prior knowledge of the 3D structure of the engine makes it possible to initialize a rendering of additional information relating to one of its parts. For example, a reference of the model, information about its quality, a pose date, etc. is displayed. With the invention, it is possible to follow the trajectory of the camera and to estimate its pose with each new image acquired. In this way, the additional information is projected in each new image acquired by the camera with the correct perspective, which guarantees that the realism of the scene seen by the camera is maintained over time.

An exemplary embodiment of the present invention aims in particular at compensating for the disadvantages of prior art.

More precisely, an exemplary embodiment proposes a more accurate solution for estimating the pose of a camera while keeping a complexity adapted to real time constraints and a simple configuration.

An exemplary embodiment provides a confidence measure associated with the estimated camera pose.

An exemplary embodiment provides a robust solution to stage obscurations.

It goes without saying that the embodiments described above have been given for information purposes only and are in no way limiting, and that many modifications can easily be made by a skilled person without going beyond the scope of the invention.

The invention claimed is:

1. A method for estimating a pose of a camera in a frame of reference of a three-dimensional scene, comprising the following acts:
- obtaining an image of colour intensities of the scene captured by the camera, called a current image;
- extracting a plurality of points of interest from the current image, each point being invariant by geometric transformation of the image;
- forming a plurality of patches in the image of colour intensities, each patch comprising a point of interest of the extracted plurality;
- predicting the 3D locations of the points of interest of the plurality of patches in a frame of reference of the scene, by application of an automatic prediction system comprising a decision random forest, comprising decision trees, each decision tree comprising separator nodes, each node being capable of binary separating a group of feature vectors from an upstream node into subgroups, transmitting the subgroups to downstream separator nodes and leaf nodes, capable of storing the 3D locations of the patches associated with a subgroup received from an upstream separator node, said system having been trained with aid of a training set comprising patches from a plurality of images of the scene acquired by the camera from a plurality of points of view, each patch from the plurality of images being associated in said set with a 2D position of its point of interest in a frame of reference of the image and with a 3D position of its point of interest in the frame of reference of the scene, the predicting act further comprising an extraction of a feature vector per patch and the application of the automatic prediction system predicts a plurality of 3D locations per extracted feature vector; and estimating a camera pose for the current image, by mapping the 2D positions of the plurality of points of interest and reprojections in the current image frame of reference of the predicted 3D locations, and wherein the method comprises in a preliminary phase an act of training the prediction system comprising a binary separation test based on a calculation of distance between the feature vector extracted from a patch of the training set and a vector of reference features and a comparison of the calculated distance with respect to a predetermined threshold.

2. The method for estimating the pose of a camera according to claim 1, wherein the extraction comprises a prediction of the feature vector by application of a second automatic prediction system, which has been trained with aid of a training set comprising patches from a plurality of images of the scene acquired by the camera from a plurality of viewpoints, each patch being associated in said set with a 2D position of its point of interest in a frame of reference of the image and a 3D position of its point of interest in the frame of reference of the scene.

3. The method for estimating the pose of a camera according to claim 2, wherein the second automatic prediction system comprising a neural network comprising several convolution layers, and the method comprises in a preliminary phase an act of training the second system from the training set, after adding to said neural network a plurality of connection layers arranged following the convolution layers.

4. The method according to claim 3, the preliminary training phase comprises obtaining 3D localizations of the plurality of points of interest in the scene reference frame, known as ground truth, by geometric triangulation of the 2D positions of the point in the image and in a previous image.

5. The method according to claim 3, further comprising prior training phase comprising an act of acquiring a depth image associated with an intensity image, the training set further comprises the depth image associated with the intensity image, and an act of obtaining 3D localizations of the plurality of points of interest in the scene's reference frame, known as ground truth by perspective projection of their 2D position and depth using a predetermined model of the camera and the known pose, in the scene's reference frame.

6. The method for estimating the pose of a camera according to claim 1, wherein the pose estimation comprises performing at least one iteration of the following sub-acts:
   determining a subset of the plurality of points of interest;
   calculating at least one pose assumption from the predicted 3D locations for the sub-assembly and the corresponding 2D positions; and
   evaluating a reprojection error of the 2D positions of the plurality of points of interest in the scene frame of reference using the calculated pose hypothesis with respect to the predicted 3D locations;

and wherein the pose estimation comprises a selection of the pose hypothesis that minimizes the reprojection error.

7. The method according to claim 6, wherein a confidence measure of the estimated pose is evaluated at least as a function of a number of points of interest, for which the reprojection error is below a predetermined threshold.

8. The method according to claim 1, wherein:
the pose estimation comprises performing at least one iteration of the following sub-acts:
   determining a subset of the plurality of points of interest;
   calculating at least one pose assumption from the predicted 3D locations for the sub-assembly and the corresponding 2D positions; and
   evaluating a reprojection error of the 2D positions of the plurality of points of interest in the scene frame of reference using the calculated pose hypothesis with respect to the predicted 3D locations;
   and wherein the pose estimation comprises a selection of the pose hypothesis that minimizes the reprojection error; and
the plurality of 3D locations predicted by the forest comprising a distribution of predicted 3D locations per tree, each said distribution being associated with a covariance measure, the estimation act comprises a prior sub-act of filtering the plurality of distributions of predicted 3D locations by comparing the associated covariance measure a distribution with a threshold and suppression of the predicted distribution whose covariance measure is greater than or equal to said threshold.

9. An apparatus comprising:
a device for estimating a pose of a camera in a reference frame of a three-dimensional scene, said device comprising:
a computing machine dedicated to or configured to:
obtaining a color intensity image of the scene captured by the camera, called a current image;
extracting a plurality of points of interest from the current image, each point being invariant by geometric transformation of the image;
forming a plurality of patches in the image of color intensities, each patch comprising a point of interest of the extracted plurality;
predicting 3D locations of the points of interest of the plurality of patches in a scene repository by applying an automatic prediction system comprising a decision random forest, comprising decision trees, each decision tree comprising separator nodes, each node being capable of binary separating a group of feature vectors from an upstream node into subgroups, transmitting the subgroups to downstream separator nodes and leaf nodes, capable of storing the 3D locations of the patches associated with a subgroup received from an upstream separator node, said system having been trained using a training set comprising patches from a plurality of images of the scene acquired by the camera from a plurality of viewpoints, each patch from the plurality of images being associated with a 2D position of its point of interest in an image repository and a 3D position of its point of interest in the scene repository, the prediction further comprising an extraction of a feature vector per patch and the application of the automatic prediction system predicts a plurality of 3D locations per extracted feature vector; and estimating the pose of a camera for the current image, by mapping the 2D positions of the plurality of points of interest and reprojections in the current image frame of reference of the predicted 3D locations, and wherein the computing machine is configured to implement in a preliminary phase a training of the prediction system comprising a binary separation test based on a calculation of distance between the feature vector extracted from a patch of the training set and a vector of reference features and a comparison of the calculated distance with respect to a predetermined threshold.

10. The apparatus according to claim 9, further comprising:

the camera, which is capable of acquiring the image of colour intensities of the real three-dimensional scene, an image composition module configured to compose an output image from an input image acquired from the scene by the camera and at least one real or virtual object, using an initial 3D location of said at least one object in the scene and an estimated pose of the camera, and a display module capable of reproducing the output image.

11. A non-transitory computer-readable recording medium on which is recorded a computer program comprising program code instructions for implementing a method for estimating a pose of a camera in a frame of reference of a three-dimensional scene, when the instructions are executed by a processor, wherein the instructions configure the processor to:

obtain an image of colour intensities of the scene captured by the camera, called a current image;

extract a plurality of points of interest from the current image, each point being invariant by geometric transformation of the image;

form a plurality of patches in the image of colour intensities, each patch comprising a point of interest of the extracted plurality;

predict the 3D locations of the points of interest of the plurality of patches in a frame of reference of the scene, by application of an automatic prediction system comprising a decision random forest, comprising decision trees, each decision tree comprising separator nodes, each node being capable of binary separating a group of feature vectors from an upstream node into subgroups, transmitting the subgroups to downstream separator nodes and leaf nodes, capable of storing the 3D locations of the patches associated with a subgroup received from an upstream separator node, said system having been trained with aid of a training set comprising patches from a plurality of images of the scene acquired by the camera from a plurality of points of view, each patch from the plurality of images being associated in said set with a 2D position of its point of interest in a frame of reference of the image and with a 3D position of its point of interest in the frame of reference of the scene, the training of the prediction system in a preliminary phase comprising a binary separation test based on a calculation of distance between the feature vector extracted from a patch of the training set and a vector of reference features and a comparison of the calculated distance with respect to a predetermined threshold, the prediction further comprising an extraction of a feature vector per patch and the application of the automatic prediction system predicts a plurality of 3D locations per extracted feature vector; and estimate a camera pose for the current image, by mapping the 2D positions of the plurality of points of interest and reprojections in the current image frame of reference of the predicted 3D locations.

* * * * *